(12) United States Patent
Chen

(10) Patent No.: US 10,857,968 B2
(45) Date of Patent: Dec. 8, 2020

(54) LATERAL SHOCK ABSORBER AND CHILD CAR SAFETY SEAT THEREWITH

(71) Applicant: Bambino Prezioso Switzerland AG, Steinhausen (CH)

(72) Inventor: Hong-Bo Chen, Guangdong (CN)

(73) Assignee: Bambino Prezioso Switzerland AG, Steinhausen (CH)

( * ) Notice: Subject to any disclaimer, the term of this patent is extended or adjusted under 35 U.S.C. 154(b) by 42 days.

(21) Appl. No.: 16/212,607

(22) Filed: Dec. 6, 2018

(65) Prior Publication Data

US 2019/0176746 A1 Jun. 13, 2019

(30) Foreign Application Priority Data

Dec. 7, 2017 (CN) .......................... 2017 1 1312256
Nov. 27, 2018 (CN) .......................... 2018 1 1428795

(51) Int. Cl.
 *B60N 2/28* (2006.01)
 *B60N 2/42* (2006.01)
 (Continued)

(52) U.S. Cl.
 CPC .......... *B60R 22/105* (2013.01); *B60N 2/2821* (2013.01); *B60N 2/2851* (2013.01);
 (Continued)

(58) Field of Classification Search
 CPC .. B60N 2/2821; B60N 2/2851; B60N 2/2872; B60N 2/2884; B60N 2/2881;
 (Continued)

(56) References Cited

U.S. PATENT DOCUMENTS

2006/0043777 A1* 3/2006 Friedman ................. B60N 2/99
 297/216.13
2013/0234479 A1 9/2013 Powell
 (Continued)

FOREIGN PATENT DOCUMENTS

CN 207725262 U * 8/2018
CN 110271464 A * 9/2019
 (Continued)

OTHER PUBLICATIONS

Recaro Child Safety GmbH & Co. KG, Instructions for Installation and Use, Zero.1 Elite, 20160808.

*Primary Examiner* — Ryan D Kwiecinski
(74) *Attorney, Agent, or Firm* — Winston Hsu

(57) ABSTRACT

The present invention discloses a lateral shock absorber disposed on a base of a child car safety seat. The lateral shock absorber includes a protective fender. An end of the protective fender is pivoted to the base, so that the protective fender is pivotally switchable between a folded state and an unfolded state relative to the base. The unfolded protective fender can collide with a car body during a side impact collision for transferring a side impact to the base and away from a child sitting in the child car safety seat. Therefore, it can effectively reduce a risk of injury or death of the child due to the side impact and provide enhanced protection for the child. Furthermore, the lateral shock absorber has advantages of simple structure and easy operation. Besides, the present invention further discloses a child car safety seat with the aforementioned lateral shock absorber.

29 Claims, 28 Drawing Sheets

(51) Int. Cl.
  *B60R 21/05* (2006.01)
  *B60R 22/10* (2006.01)
  *B60R 21/055* (2006.01)
  *B60R 22/28* (2006.01)
  *B60R 21/00* (2006.01)

(52) U.S. Cl.
  CPC ......... *B60N 2/2872* (2013.01); *B60N 2/2881* (2013.01); *B60N 2/2884* (2013.01); *B60N 2/4235* (2013.01); *B60R 21/055* (2013.01); *B60R 22/28* (2013.01); *B60R 2021/0006* (2013.01); *B60R 2021/006* (2013.01)

(58) Field of Classification Search
  CPC .......... B60N 2/4235; B60R 2021/0006; B60R 2021/0009; B60R 2021/006; B60R 21/055; B60R 22/105; B60R 22/28
  See application file for complete search history.

(56) References Cited

U.S. PATENT DOCUMENTS

| | | | |
|---|---|---|---|
| 2014/0117729 A1 | 5/2014 | Allen | |
| 2016/0039319 A1* | 2/2016 | Zhang | B60N 2/2881 297/216.11 |
| 2018/0244178 A1* | 8/2018 | Pos | B60N 2/2821 |
| 2020/0101876 A1* | 4/2020 | Cui | B60N 2/2872 |

FOREIGN PATENT DOCUMENTS

| | | | | |
|---|---|---|---|---|
| DE | 20 2012 102 471 U1 | | 9/2012 | |
| DE | 202015104791 U1 | * | 11/2015 | ........... B60N 2/4235 |
| DE | 10 2015 113 836 A1 | | 2/2017 | |
| DE | 102015113836 A1 | * | 2/2017 | ........... B60N 2/4235 |
| EP | 2746097 A1 | * | 6/2014 | ........... B60N 2/2866 |
| EP | 3 006 261 A1 | | 4/2016 | |
| EP | 2 368 752 B1 | | 10/2017 | |
| FR | 3026686 A1 | * | 4/2016 | ........... B60N 2/4235 |
| GB | 2531121 A | | 4/2016 | |
| WO | WO-2017029272 A1 | * | 2/2017 | ........... B60N 2/2851 |
| WO | 2017/042326 A1 | | 3/2017 | |

* cited by examiner

LATERAL SHOCK ABSORBER AND CHILD CAR SAFETY SEAT THEREWITH

BACKGROUND OF THE INVENTION

1. Field of the Invention

The present invention relates to a child product, and more particularly, to a lateral shock absorber and a child car safety seat therewith.

2. Description of the Prior Art

In order to improve safety of a child riding in a car, a child car safety seat is installed on a car seat for allowing the child to sit therein to provide enhanced protection for the child. The child car safety seat not only can reduce an frontal impact on the child and effectively prevent forward movement of the child to avoid a second collision of the child's body in an emergency brake situation or a frontal impact collision but also can provide necessary support for the child's body and head to effectively reduce a risk of injury or death of the child by preventing rapid rearward movement of the child's neck in a rear impact collision, so as to improve the safety of the child riding in the car by providing protective, buffering and restraining effects for the child. Therefore, the child car safety seat becomes more and more popular worldwide.

The conventional child car safety seat usually includes a backrest and a headrest to protect the child's body and head. However, such configuration cannot effectively reduce a side impact on the child during a side impact collision, which becomes an important topic for the safety of the child.

Therefore, there is a need to provide a child car safety seat capable of reducing a side impact on a child during a side impact collision for solving the aforementioned problem.

SUMMARY OF THE INVENTION

It is an objective of the present invention to provide a lateral shock absorber capable of reducing a side impact on a child and a child car safety seat therewith for solving the aforementioned problem.

In order to achieve the aforementioned objective, the present invention discloses a lateral shock absorber. The lateral shock absorber includes a protective fender and a locking mechanism. The protective fender is pivoted to a base of a child car safety seat and pivotally switchable between a folded state or an unfolded state relative to the base. The locking mechanism is for selectively engaging with the protective fender to restrain the protective fender from switching to the unfolded state or disengaging from the protective fender to allow the protective fender to switch to the unfolded state when the protective fender is located in the folded state.

According to an embodiment of the present invention, the lateral shock absorber further includes a resilient component for biasing the protective fender to switch to the unfolded state.

According to an embodiment of the present invention, the resilient component is a torsional spring disposed on a pivoting shaft of the protective fender and abutting between the protective fender and the base.

According to an embodiment of the present invention, the locking mechanism includes a locking component and a recovering component. A locking hole is formed on one of the base and the protective fender. An installing hole is formed on the other one of the base and the protective fender. The locking component and the recovering component are installed inside the installing hole, and the recovering component biases the locking component to recover to engage with the locking hole for restraining the protective fender from moving.

According to an embodiment of the present invention, the locking mechanism further includes a restraining portion disposed inside the installing hole for restraining a displacement distance of the locking component.

According to an embodiment of the present invention, the locking mechanism further includes a driving pin. A through hole is formed on the locking component, and the driving pin is inserted into the through hole to be fixed on the locking component.

According to an embodiment of the present invention, the lateral shock absorber further includes a releasing portion disposed on a bottom portion of a seat body of the child car safety seat, and the releasing portion drives the driving pin to disengage the locking component from the locking hole when the seat body is installed on the base.

According to an embodiment of the present invention, a first guiding inclined surface is formed on a lower end of the protective fender. A second guiding inclined surface is formed on the locking component, and the locking component is driven by cooperation of the first guiding inclined surface and the second guiding inclined surface and the recovering component to engage with the locking hole when the protective fender switches from the unfolded state to the folded state.

According to an embodiment of the present invention, the locking mechanism is disposed on the base. The locking mechanism includes a locking assembly, an abutting component and an abutting block connected to the abutting component. The locking assembly engages with the protective fender to restrain the protective fender from moving. The locking assembly includes at least one protruding lug. The abutting component includes a first abutting portion detachably abutting against the at least one protruding lug. The abutting component is driven by the abutting block to press the at least one protruding lug to disengage the locking assembly from the protective fender when the abutting block is pressed downwardly to a first position, and the abutting component is driven by the abutting block to disengage the first abutting portion from the at least one protruding lug when the abutting block is pressed downwardly from the first position to a second position lower than the first position.

According to an embodiment of the present invention, the abutting component further includes a second abutting portion. A vertical distance between the second abutting portion and the at least one protruding lug is greater than a vertical distance between the first abutting portion and the at least one protruding lug, and the at least one protruding lug abuts against the second abutting portion after disengagement of the at least one protruding lug and the first abutting portion.

According to an embodiment of the present invention, the abutting block and the abutting component are integrally formed.

According to an embodiment of the present invention, the locking assembly includes a locking rod, a pivoting component and a first recovering component. The locking rod includes a locking end and a connecting end. The locking end engages with the protective fender to restrain the protective fender from moving. The connecting end is pivoted to the pivoting component. The at least one protruding lug is disposed on the pivoting component. The first recovering component biases the locking rod to recover to engage with the protective fender, and when the abutting block is pressed downwardly from the first position to the second position, the abutting component is driven by the abutting block to disengage the first abutting portion from the at least one protruding lug, so that the locking rod is driven by the first recovering component to engage with the protective fender.

According to an embodiment of the present invention, the locking rod further includes a block plate located between the locking end and the connecting end, and the first recovering component abuts between the block plate and the base.

According to an embodiment of the present invention, the locking mechanism further includes a pushing component disposed beneath the pivoting component. The pushing component includes a pushing inclined surface for abutting a lower end of the pivoting component, and the pivoting component is driven by the pushing inclined surface to pivot to disengage the at least one protruding lug from the first abutting portion.

According to an embodiment of the present invention, the locking mechanism further includes a second recovering component abutting against the base and the abutting block for biasing the abutting block to recover.

According to an embodiment of the present invention, the protective fender includes a driving block, a supporting block and a combining assembly. The driving block is pivoted to the base. The driving block includes a protruding portion biased to pivot upwardly to switch the protective fender to the folded state, and the supporting block is pivoted to the driving block and engages with the driving block by the combining assembly.

According to an embodiment of the present invention, an included angle between the protective fender in the unfolded state and a lateral surface of the base is substantially from 90 to 145 degrees.

According to an embodiment of the present invention, the combining assembly includes a pulling plate, at least one inserting pin and a first resilient component abutting against the at least one inserting pin. At least one inserting slot is formed on the driving block for allowing the at least one inserting pin to pass therethrough. The supporting block is pivoted to the driving block at a position between the at least one inserting slot and the protruding portion. A first pulling slot and a second pulling slot are formed on the pulling plate. A first column protrudes from the supporting block and passes through the first pulling slot. A second column protrudes from the at least one inserting pin and passes through the second pulling slot. The first resilient component biases the at least one inserting pin to recover to engage with the at least one inserting slot. The supporting block is restrained from pivoting relative to the driving block when the at least one inserting pin engages with the at least one inserting slot, and the supporting block is allowed to pivot relative to the driving block when the pulling plate is operated to disengage the at least one inserting pin from the at least one inserting slot.

According to an embodiment of the present invention, the second pulling slot includes a first side and a second side. A length of the second side is less than a length of the first side. The at least one inserting pin is located at the first side when the at least one inserting pin engages with the at least one inserting slot, and the at least one inserting pin is located at the second side when the at least one inserting pin disengages from the at least one inserting slot.

According to an embodiment of the present invention, the combining assembly includes a pulling plate and a first resilient unit. The first resilient unit abuts between the pulling plate and the supporting block. The supporting block is pivoted to the driving block at a position near an end of the driving block away from the protruding portion, and the supporting block is aligned with the end of the driving block when the supporting block is pivotally folded relative to the driving block.

According to an embodiment of the present invention, the lateral shock absorber further includes a restraining mechanism. An end of the restraining mechanism is disposed on the base, and another end of the restraining mechanism is movable relative to the driving block for engaging with the driving block to restrain the driving block from being pivotally folded relative to the base.

According to an embodiment of the present invention, the restraining mechanism includes a restraining component, a restraining switch and a second resilient component. The restraining switch is installed on the base. The second resilient component abuts against the restraining component and the base. An end of the restraining component is installed on the restraining switch, and the restraining switch controls another end of the restraining component to extend outwardly to engage with driving block or retract inwardly to disengage from the driving block.

According to an embodiment of the present invention, a restraining slot is formed on the restraining switch. The restraining slot includes a first end and a second end. A width of the restraining slot gradually increases from the first end to the second end, and a restraining column protrudes from the restraining component and passes through the restraining slot.

According to an embodiment of the present invention, the locking mechanism is disposed on the base. The locking mechanism includes a locking assembly, an abutting component movably connected to the locking assembly, a third resilient component and an abutting block connected to the abutting component. The locking assembly engages with the protective fender to restrain the protective fender from moving. The third resilient component biases the abutting component to disengage the locking assembly from the protective fender. The abutting component is driven by the abutting block to engage the locking assembly with the protective fender when the abutting block is pressed downwardly, and the abutting component is driven by the third resilient component to disengage the locking assembly from the protective fender when the abutting block is not pressed.

According to an embodiment of the present invention, the locking assembly includes a locking rod and a first recovering component. The locking rod includes a locking end and a connecting end. The locking end engages with the protective fender to restrain the protective fender from moving. A sliding slot is formed on the abutting component. A sliding column protrudes from the connecting end and passes through the sliding slot, and the first recovering component biases the locking rod to recover to engage with the protective fender.

According to an embodiment of the present invention, the locking rod further includes a block plate located between the locking end and the connecting end, and the first recovering component abuts between the block plate and the abutting component.

In order to achieve the aforementioned objective, the present invention further discloses a child car safety seat. The child car safety seat includes a base and at least one lateral shock absorber. The at least one lateral shock absorber includes a protective fender, a locking mechanism and a resilient component. The protective fender is pivoted to the base and pivotally switchable between a folded state or an unfolded state relative to the base. The locking mechanism is for selectively engaging with the protective fender to restrain the protective fender from switching to the unfolded state or disengaging from the protective fender to allow the protective fender to switch to the unfolded state when the protective fender is located in the folded state. The resilient component is for biasing the protective fender to switch to the unfolded state.

According to an embodiment of the present invention, the base includes at least one connecting portion, and the at least one lateral shock absorber is pivoted to the at least one connecting portion.

According to an embodiment of the present invention, a first recess is formed on an upper end of the at least one connecting portion for installing an end of the resilient component.

According to an embodiment of the present invention, a second recess is formed on the at least one connecting portion, and a first protrusion is formed on the at least one lateral shock absorber and located at a position corresponding to the second recess.

According to an embodiment of the present invention, a long slot is formed on the at least one connecting portion for allowing the locking mechanism to be operated to disengage from the protective fender.

According to an embodiment of the present invention, the child car safety seat further includes a seat body. The seat body includes at least one engaging portion. At least one engaging slot is formed on the base, and the seat body is detachably installed on the base by engagement of the at least one engaging portion and the at least one engaging slot.

According to an embodiment of the present invention, the child car safety seat further includes an operating component connected to the locking mechanism for driving the locking mechanism to disengage from the protective fender.

In contrast to the prior art, the present invention utilizes the lateral shock absorber disposed on the base to collide with a car body during a side impact collision for transferring a side impact to the base and away from a child sitting in the child car safety seat. Therefore, it can effectively reduce a risk of injury or death of the child due to the side impact and provide enhanced protection for the child. Furthermore, the present invention utilizes the locking mechanism to restrain or allow pivotal movement of the protective fender of the lateral shock absorber in the folded state. Therefore, it has advantages of simple structure and easy operation and is capable of providing a convenient way for a caregiver to operate the lateral shock absorber.

These and other objectives of the present invention will no doubt become obvious to those of ordinary skill in the art after reading the following detailed description of the preferred embodiment that is illustrated in the various figures and drawings.

DETAILED DESCRIPTION

In the following detailed description of the preferred embodiments, reference is made to the accompanying drawings which form a part hereof, and in which is shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. Accordingly, the drawings and descriptions will be regarded as illustrative in nature and not as restrictive.

Figure 1:
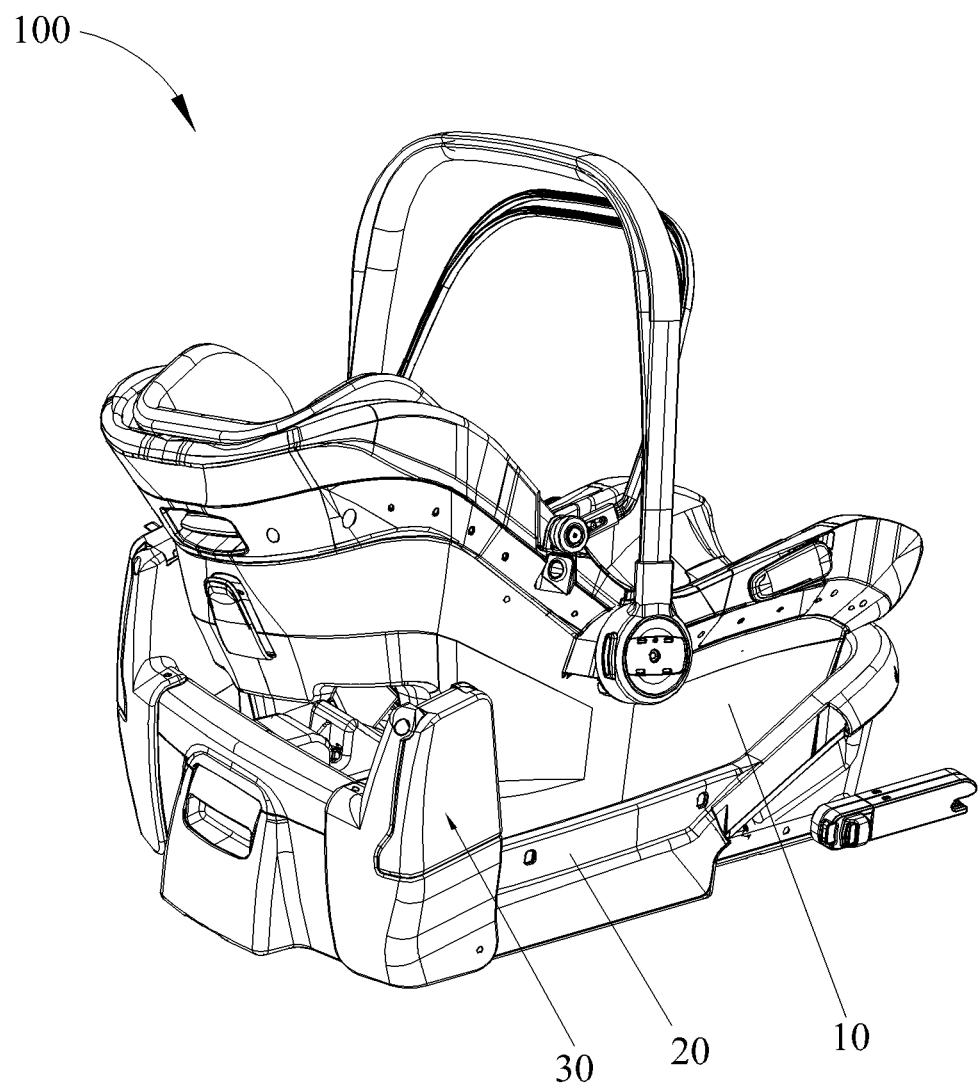
FIG. 1 and FIG. 2 are schematic diagrams of a child car safety seat in different states according to a first embodiment of the present invention.
Figure 2:
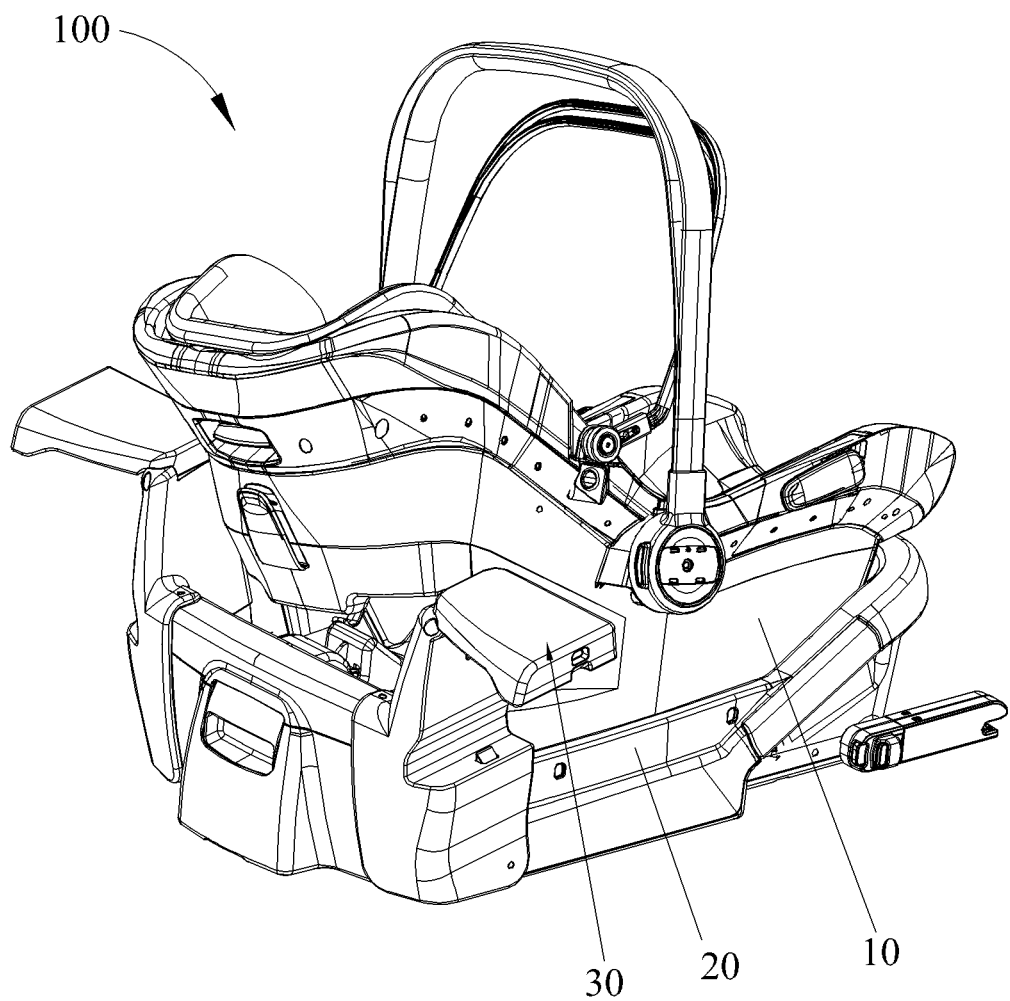
Figure 3:
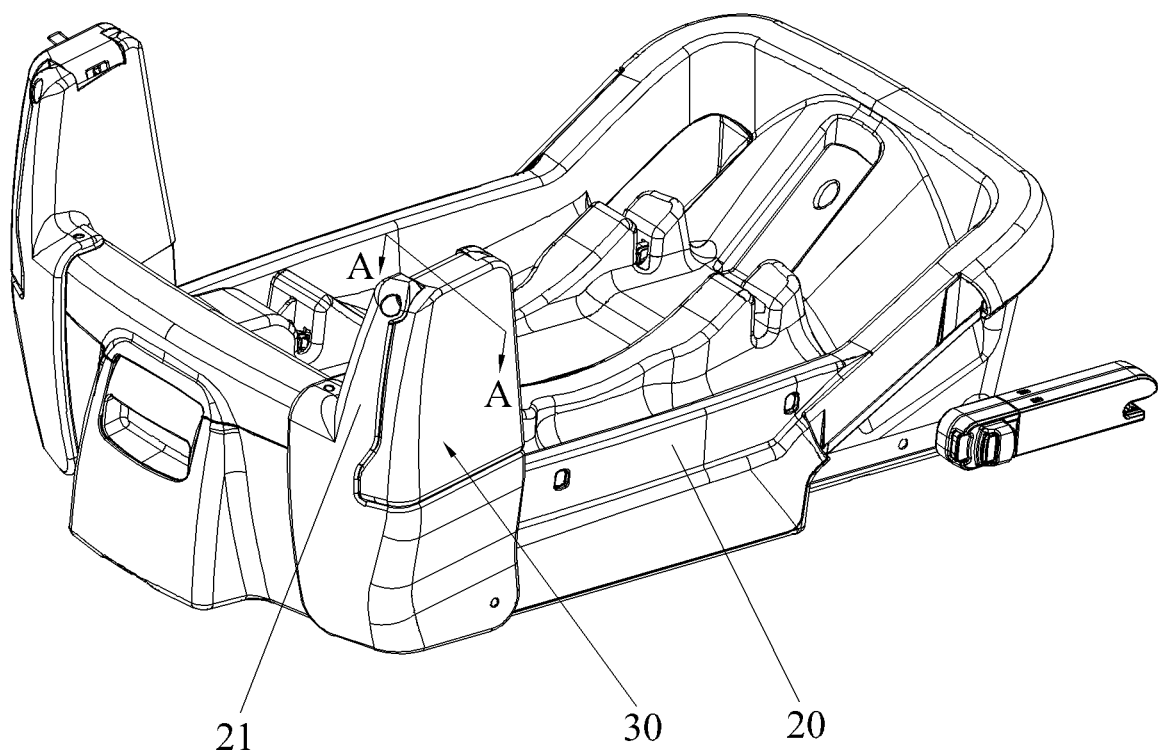
FIG. 3 and FIG. 4 are partial diagrams of the child car safety seat shown in FIG. 1 at different views according to the first embodiment of the present invention.
Figure 4:
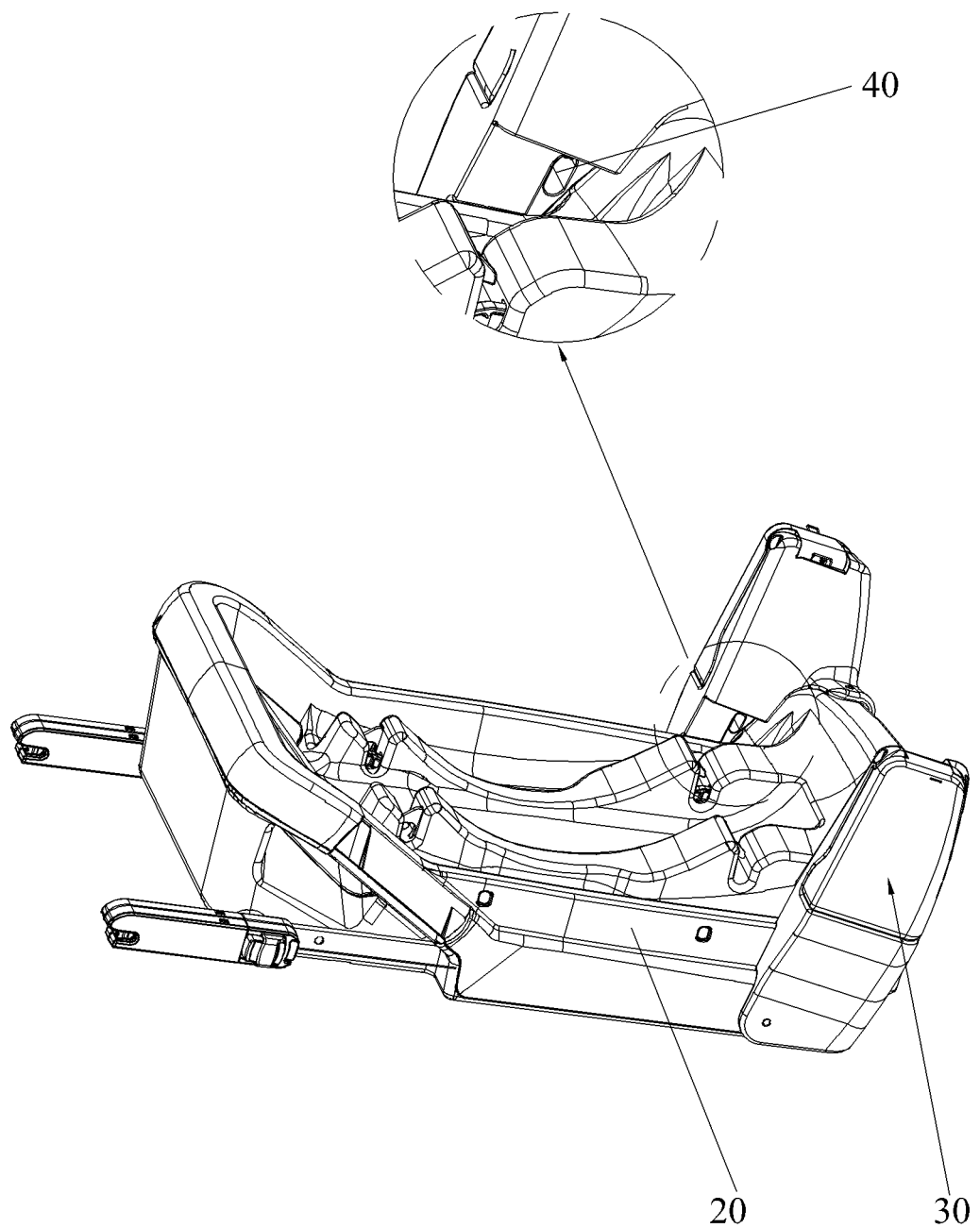
Figure 5:
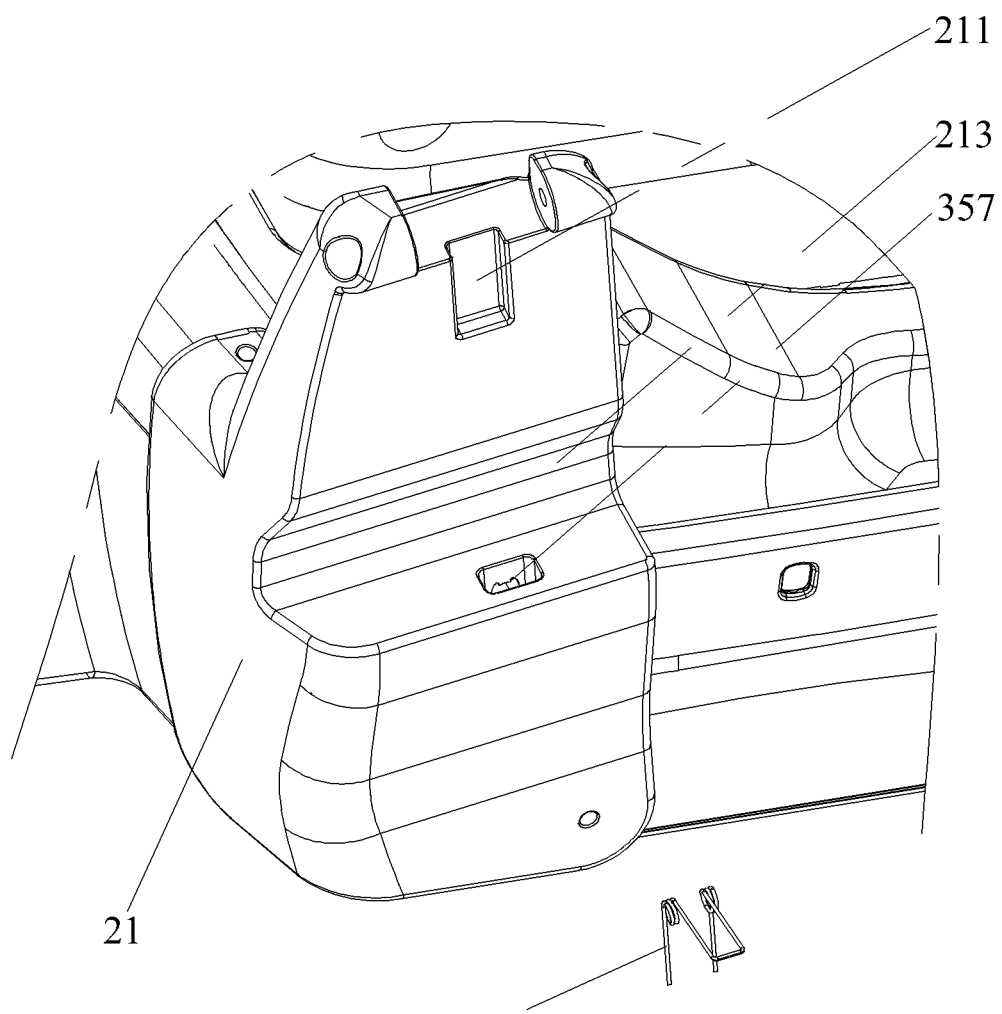
FIG. 5 is a partial exploded diagram of the child car safety seat according to the first embodiment of the present invention.
Figure 5:
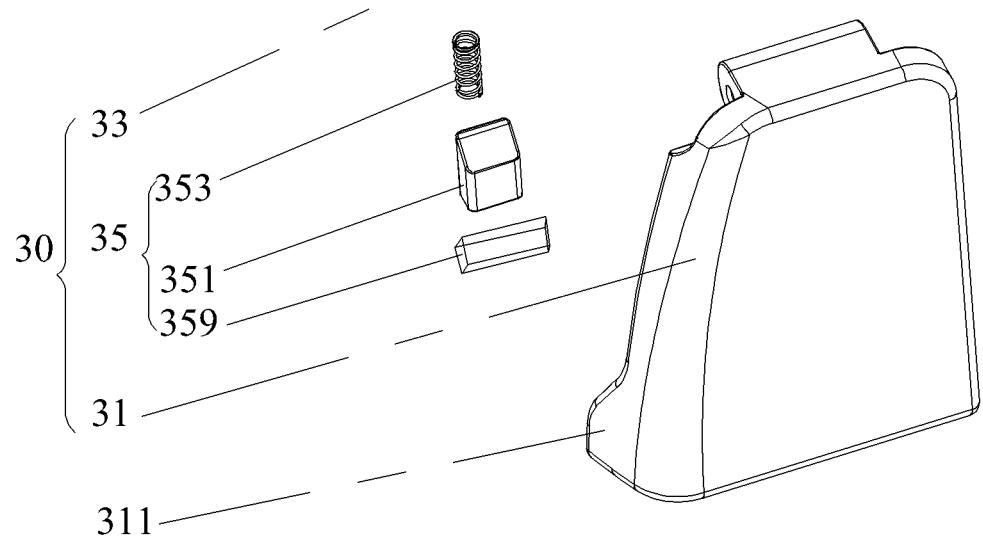
Figure 6:
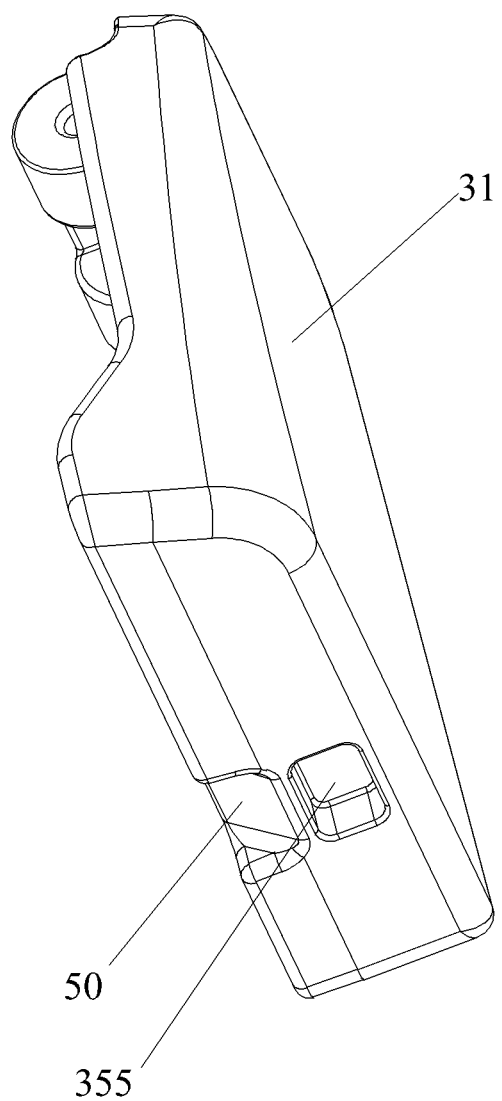
FIG. 6 is a diagram of a protective fender according to the first embodiment of the present invention.
Figure 7:
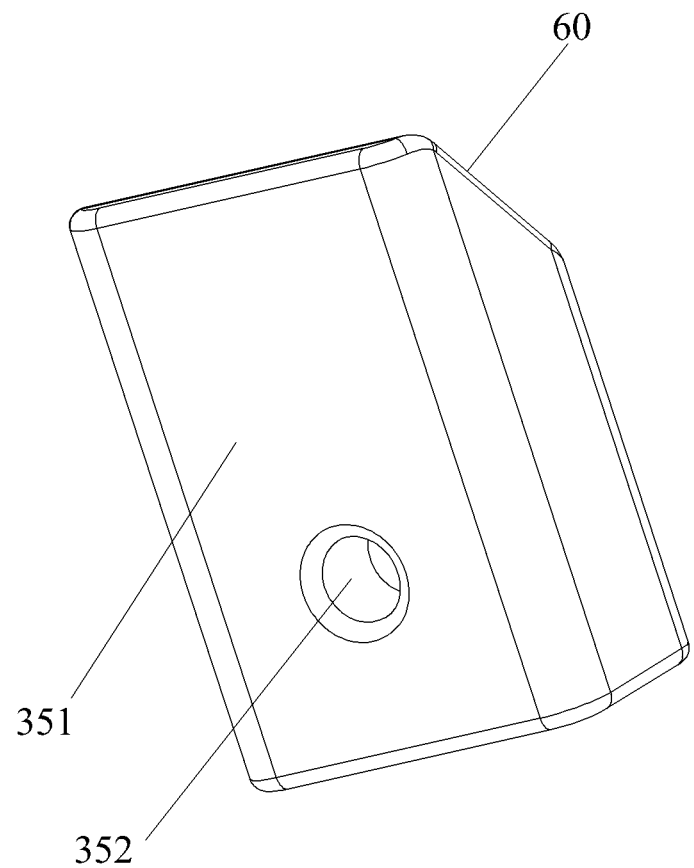
FIG. 7 is a diagram of a locking component according to the first embodiment of the present invention.
Figure 8:
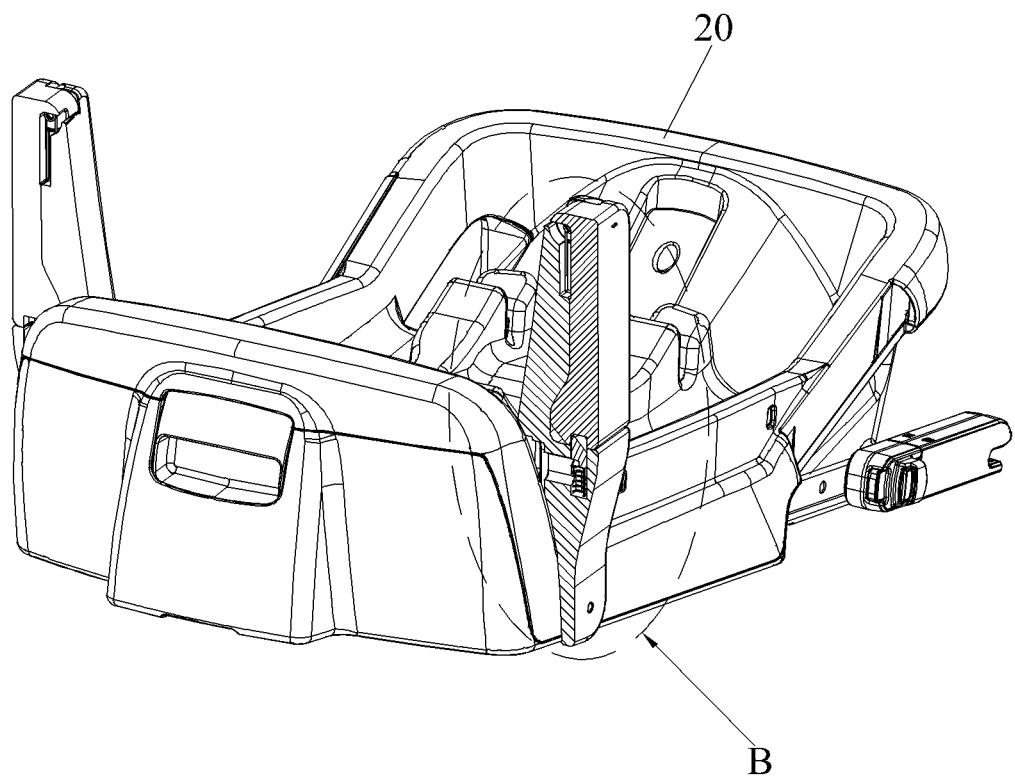
FIG. 8 is a sectional diagram of the child car safety seat along an A-A line shown in FIG. 3 according to the first embodiment of the present invention.
Figure 9:
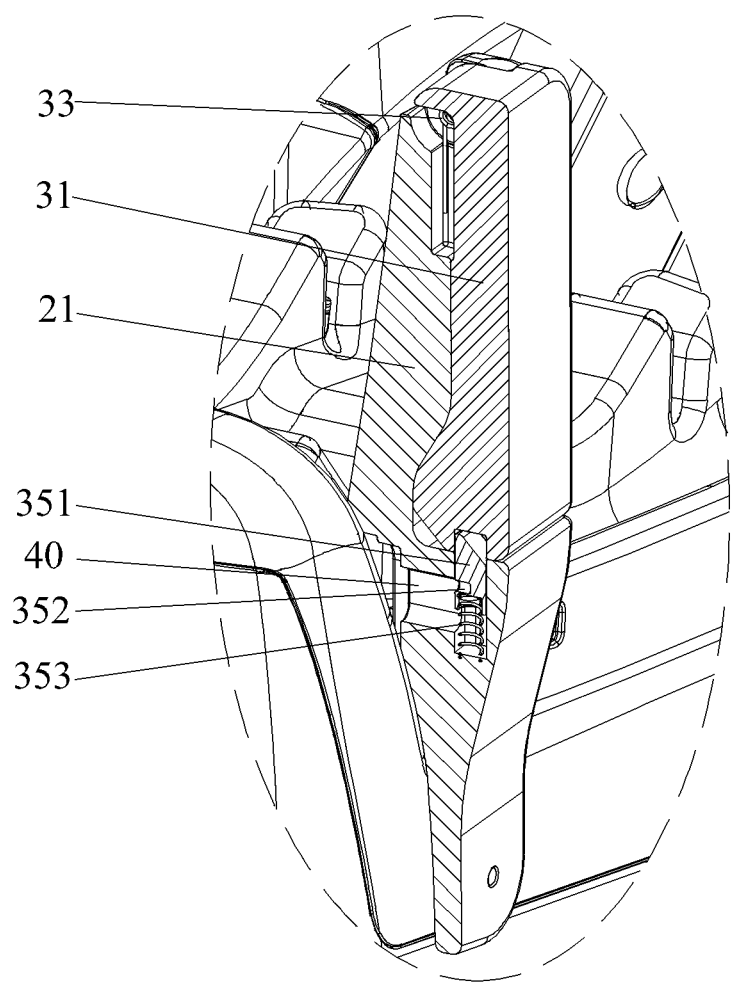
FIG. 9 is an enlarged diagram of a B portion of the child car safety seat shown in FIG. 8 according to the first embodiment of the present invention.
Figure 10:
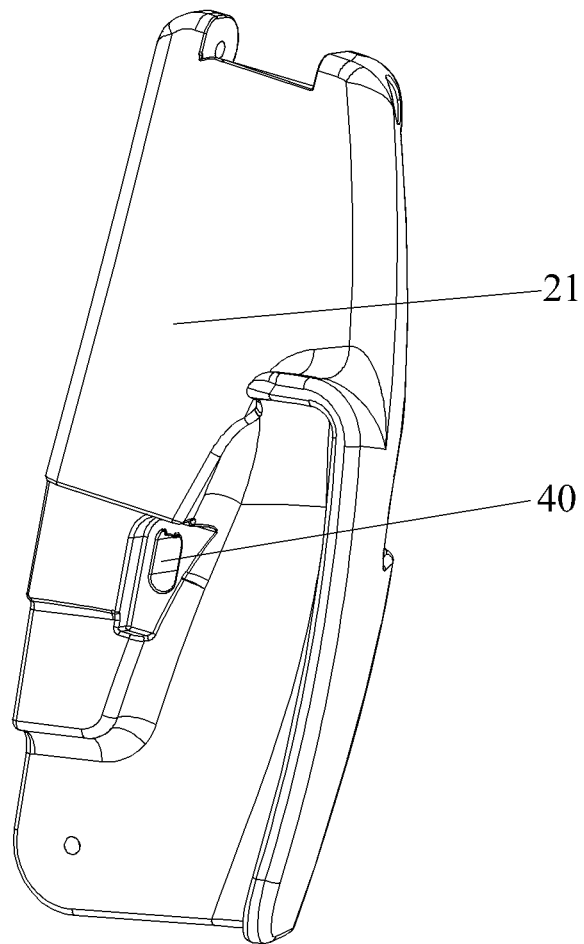
FIG. 10 is a diagram of a connecting portion shown in FIG. 3 according to the first embodiment of the present invention.

Please refer to FIG. 1 to FIG. 10. FIG. 1 and FIG. 2 are schematic diagrams of a child car safety seat 100 in different states according to a first embodiment of the present invention. FIG. 3 and FIG. 4 are partial diagrams of the child car safety seat 100 shown in FIG. 1 at different views according to the first embodiment of the present invention. FIG. 5 is a partial exploded diagram of the child car safety seat 100 according to the first embodiment of the present invention. FIG. 6 is a diagram of a protective fender 31 according to the first embodiment of the present invention. FIG. 7 is a diagram of a locking component 351 according to the first embodiment of the present invention. FIG. 8 is a sectional diagram of the child car safety seat 100 along an A-A line shown in FIG. 3 according to the first embodiment of the present invention. FIG. 9 is an enlarged diagram of a B portion of the child car safety seat 100 shown in FIG. 8 according to the first embodiment of the present invention. FIG. 10 is a diagram of a connecting portion 21 shown in FIG. 3 according to the first embodiment of the present invention. As shown in FIG. 1 and FIG. 2, the child car safety seat 100 includes a seat body 10 and a base 20 and two lateral shock absorbers 30. The seat body 10 is installed on the base 20 for accommodating a child. The two lateral shock absorbers 30 are disposed on two sides of the base 20. The two lateral shock absorbers 30 can be operated to switch from a folded state as shown in FIG. 1 to an unfolded state as shown in FIG. 2 relative to the base 20 when the child car safety seat 100 is installed on a car seat. During a side impact collision, the child car safety seat 100 can collide with a car body by the lateral shock absorbers 30, so as to transfer a side impact to the base 20 and away from the child, which can achieve a purpose of reducing a risk of injury or death of the child due to the side impact and provide enhanced protection for the child. However, the number of the lateral shock absorber 30 is not limited to this embodiment. For example, in another embodiment, the child car safety seat also can include only one lateral shock absorber disposed on one side of the base.

The two lateral shock absorbers 30 have identical structures. For simplicity, one of the two lateral shock absorbers 30 at one side is introduced as follows. As shown in FIG. 3 to FIG. 5, the lateral shock absorber 30 includes the protective fender 31, a resilient component 33 and a locking mechanism 35. An end of the protective fender 31 is pivoted to the base 20, so that the protective fender 31 is pivotally switchable between the folded state and the unfolded state relative to the base 20. The resilient component 33 is for biasing the protective fender 31 to switch to the unfolded state. The locking mechanism 35 is for selectively engaging with the protective fender 31 to restrain the protective fender 31 from switching to the unfolded state or from disengaging from the protective fender 31 to allow the protective fender 31 to switch to the unfolded state by the resilient component 33 when the protective fender 31 is located in the folded state.

In order to facilitate pivotal connections of the ends of the two protective fenders 31 and the base 20, the base 20 includes the two connecting portions 21 and a base body. The two connecting portions 21 protrude from the base body. Preferably, the two connecting portions 21 can protrude from end portions of two of four corners of the base body. The two protective fenders 31 are pivotally connected to the two connecting portions 21, respectively. Furthermore, the protective fender 31 and the corresponding connecting portion 21 are arranged side by side when the protective fender 31 is in the folded state. Preferably, a first protrusion 311 can be formed on a lower end of the protective fender 31, and a second recess 213 can be formed on the connecting portion 21 and located at a position corresponding to the first protrusion 311, so as to facilitate the protective fender 31 to switch to the folded state by engagement of the first protrusion 311 and the second recess 213. Besides, the first protrusion 311 can increase an area of the lower end of the protective fender 31, so as to provide a better side buffering effect during a side impact collision.

Preferably, in this embodiment, the resilient component 33 can be a torsional spring disposed on a pivoting shaft of the protective fender 31 and abutting between the protective fender 31 and the connecting portion 21 to facilitate the protective fender 31 to switch to the unfolded state. More preferably, in this embodiment, a first recess 211 can be formed on an upper end of the connecting portion 21 for installing an end of the torsional spring to facilitate operation of the torsional spring. However, the type and the configuration of the resilient component 33 are not limited to this embodiment. The resilient component 33 also can be any other resilient element and disposed in a different manner.

As shown in FIG. 5 and FIG. 6, the locking mechanism 35 includes the locking component 351 and a recovering component 353. A locking hole 355 is formed on the protective fender 31. An installing hole 357 is formed on the connecting portion 21 of the base 20. The locking component 351 and the recovering component 353 are installed inside the installing hole 357. Specifically, in this embodiment, the recovering component 353 can abut between a bottom wall of the installing hole 357 and the locking component 351 for biasing the locking component 351 to engage with the locking hole 355 to restrain movement of the protective fender 31. However, it is not limited to this embodiment. For example, in another embodiment, the locking hole can be formed on the connecting portion for installing the locking component and the recovering component, and the installing hole can be formed on the protective fender. Furthermore, understandably, in another embodiment, the child car safety seat can further include an operating component connected to the locking mechanism for driving the locking mechanism to disengage from the protective fender. For example, the operating component can be connected to the locking component for driving the locking component to disengage from the locking hole to allow movement of the protective fender.

Preferably, in this embodiment, the recovering component 353 can be a compression spring. However, it is not limited thereto.

Understandably, in another embodiment, the locking mechanism can further include a restraining portion disposed inside the installing hole for restraining a displacement distance of the locking component to prevent disengagement of the locking component and the installing hole caused by the recovering component.

As shown in FIG. 5 to FIG. 10, in this embodiment, the locking mechanism further includes a driving pin 359. A through hole 352 is formed on the locking component 351. A long slot 40 is formed on the connecting portion 21 for allowing the driving pin 359 to pass therethrough. The driving pin 359 is inserted into the through hole 352 by passing through the long slot 40 to be fixed on the locking component 351. The driving pin 359 can be operated via the long slot 40 to drive the locking component 351 to disengage from the locking hole 355, so as to allow the protective fender 31 to switch from the folded state to the unfolded state. Preferably, in this embodiment, the driving pin 359 can be made of metal material and formed in a circular column, and a shape of the through hole 352 can be corresponding to a shape of the driving pin 359. However, the material and the shape of the driving pin 359 are not limited to this embodiment. For example, in another embodiment, the driving pin also can be formed in a square or rectangular column. Furthermore, the structure and the configuration of the driving pin are not limited to this embodiment. For example, in another embodiment, the driving pin can be configured to prevent the disengagement of the locking component and the locking hole by insertion of the driving pin into the through hole and to allow the disengagement of the locking component and the locking hole by removal of the driving pin from the through hole.

Besides, understandably, in another embodiment, the child car safety seat can further include two releasing portions disposed on a bottom portion of the seat body. The releasing portion is for driving the driving pin to disengage the locking component from the locking hole when the seat body is installed on the base, which simplifies operation of the child car safety seat. Specifically, the releasing portion can be a protrusion disposed on the bottom portion of the seat body and located at a position corresponding to the long slot, so that the protrusion can operate the driving pin via the long slot to disengage the locking component from the locking hole to allow the protective fender to switch to the unfolded state by the resilient component when the seat body is installed on the base, which brings convenience in use.

Furthermore, as shown in FIG. 5 to FIG. 7, a first guiding inclined surface 50 is formed on a lower end of the protective fender 31. A second guiding inclined surface 60 is formed on the locking component 351. The locking component 351 is driven by cooperation of the first guiding inclined surface 50 and the second guiding inclined surface 60 and the recovering component 353 to engage with the locking hole 355 when the protective fender 31 switches from the unfolded state to the folded state.

As shown in FIG. 1 to FIG. 10, operational principle of the child car safety seat 100 of this embodiment is provided as follows.

When the child car safety seat 100 is not in use, the protective fender 31 can be operated to pivotally switch to the folded state relative to the base 20 to save occupied space of the child car safety seat 100. During the aforementioned process, the resilient component 33 can be resiliently deformed, and the locking component 351 can be driven by cooperation of the first guiding inclined surface 50 and the second guiding inclined surface 60 and the resiliently deformed recovering component 353 to engage with the locking hole 355, so as to restrain the protective fender 31 in the folded state. Furthermore, when the protective fender 31 is in the folded state, the protective fender 31 and the connecting portion 21 are arranged side by side due to the engagement of the second recess 213 and the first protrusion 311.

When the child car safety seat 100 is in use, the protective fender 31 can be operated to pivotally switch from the folded state to the unfolded state relative to the base 20 to reduce a side impact on the child during a side impact collision. Specifically, the driving pin 359 can be operated via the long slot 40 to drive the locking component 351 to disengage from the locking hole 355 for allowing the protective fender 31 to leave away from the folded state. At this moment, the resiliently deformed resilient component 33 can drive the protective fender 31 to pivotally switch from the folded state to the unfolded state relative to the base 20. Therefore, during a side impact collision, the child car safety seat 100 can collide with the car body by the protective fender 31 of the corresponding lateral shock absorber 30, so as to transfer a side impact to the base 20 and away from the child, which can achieve the purpose of reducing the risk of injury or death of the child due to the side impact and provide the enhanced protection for the child.

Figure 11:
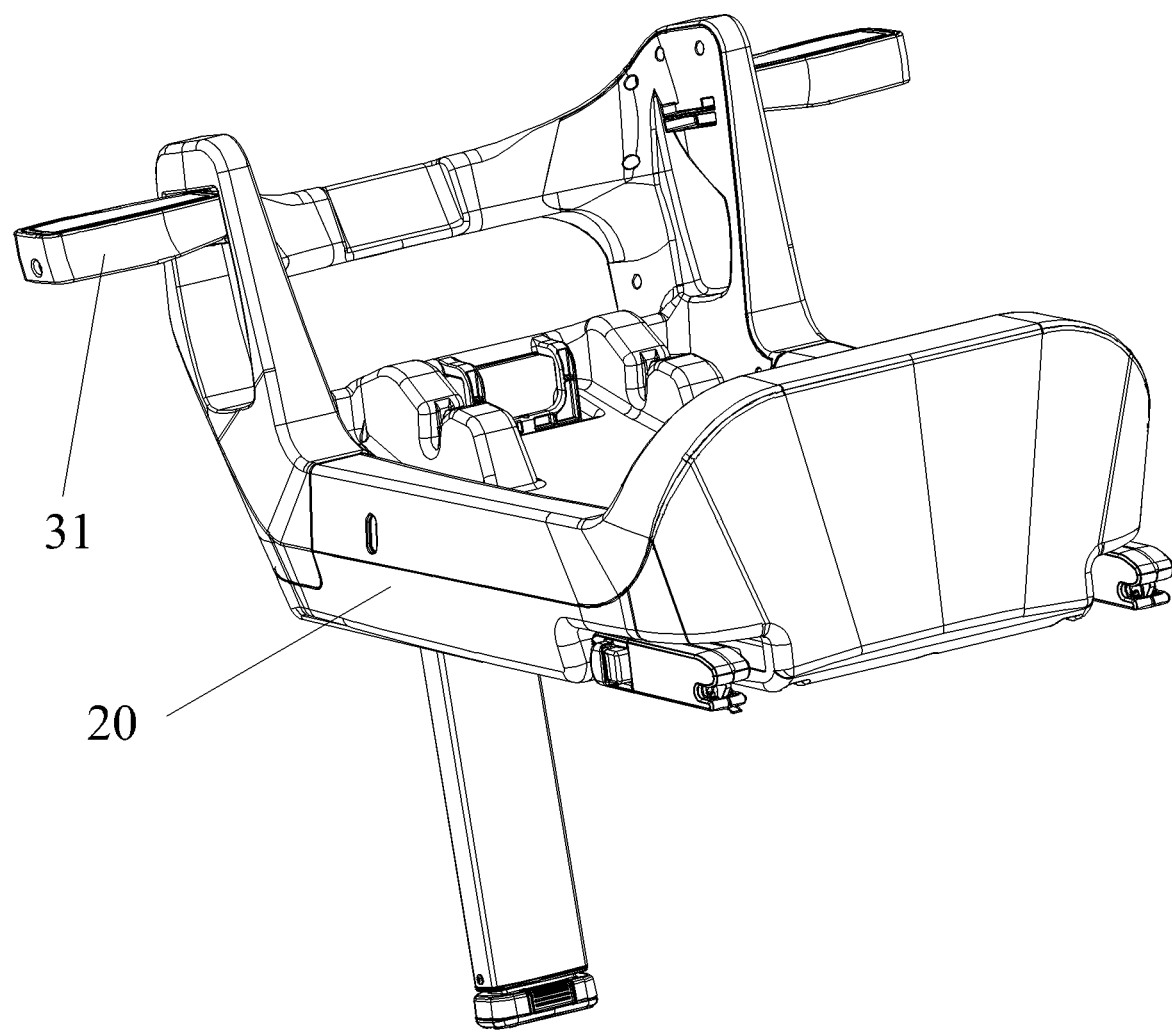
FIG. 11 is a schematic diagram of a child car safety seat in a using state without illustrating a seat body according to a second embodiment of the present invention.
Figure 12:
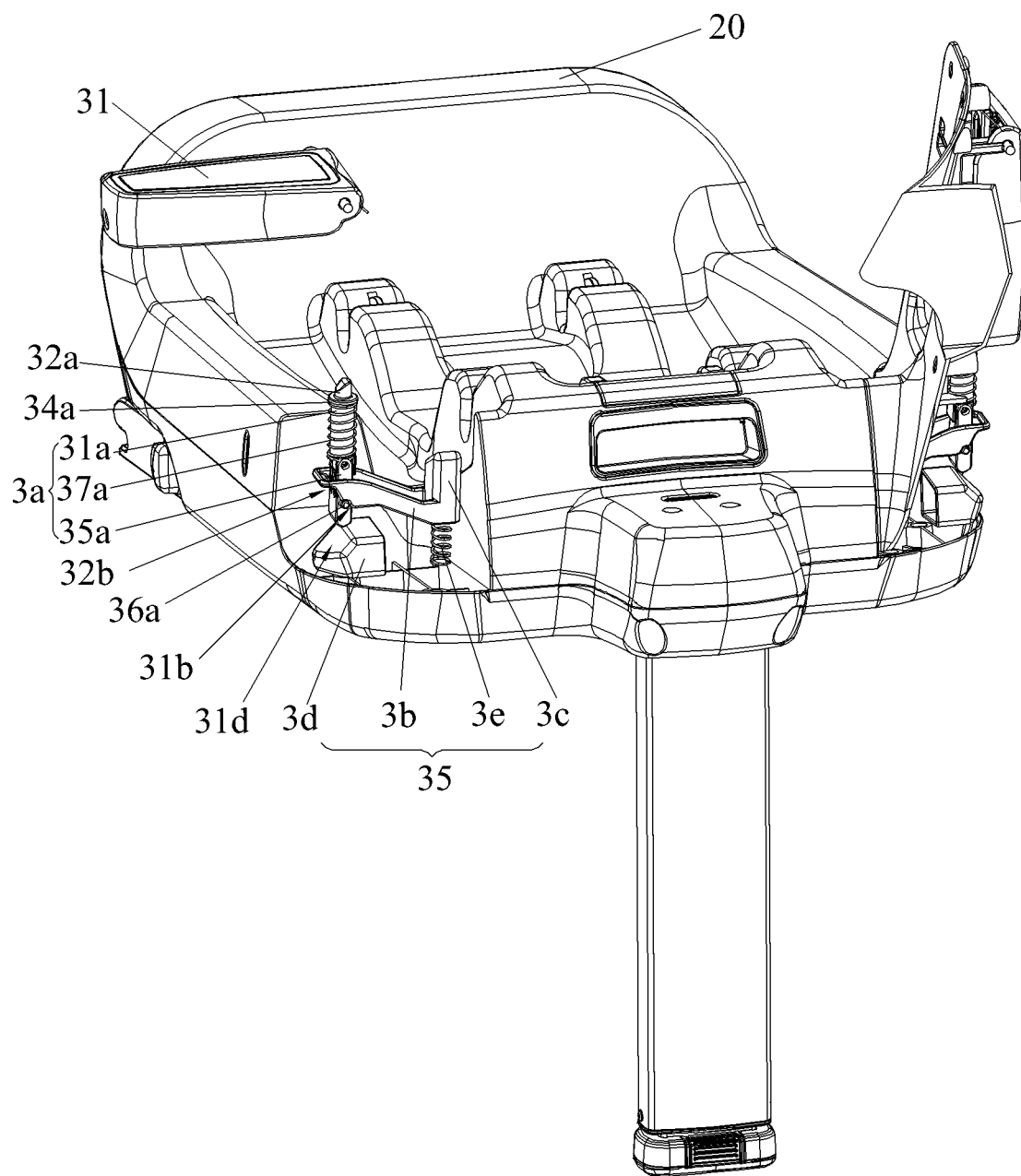
FIG. 12 is a partial diagram of a child car safety seat shown in FIG. 11 according to the second embodiment of the present invention.
Figure 13:
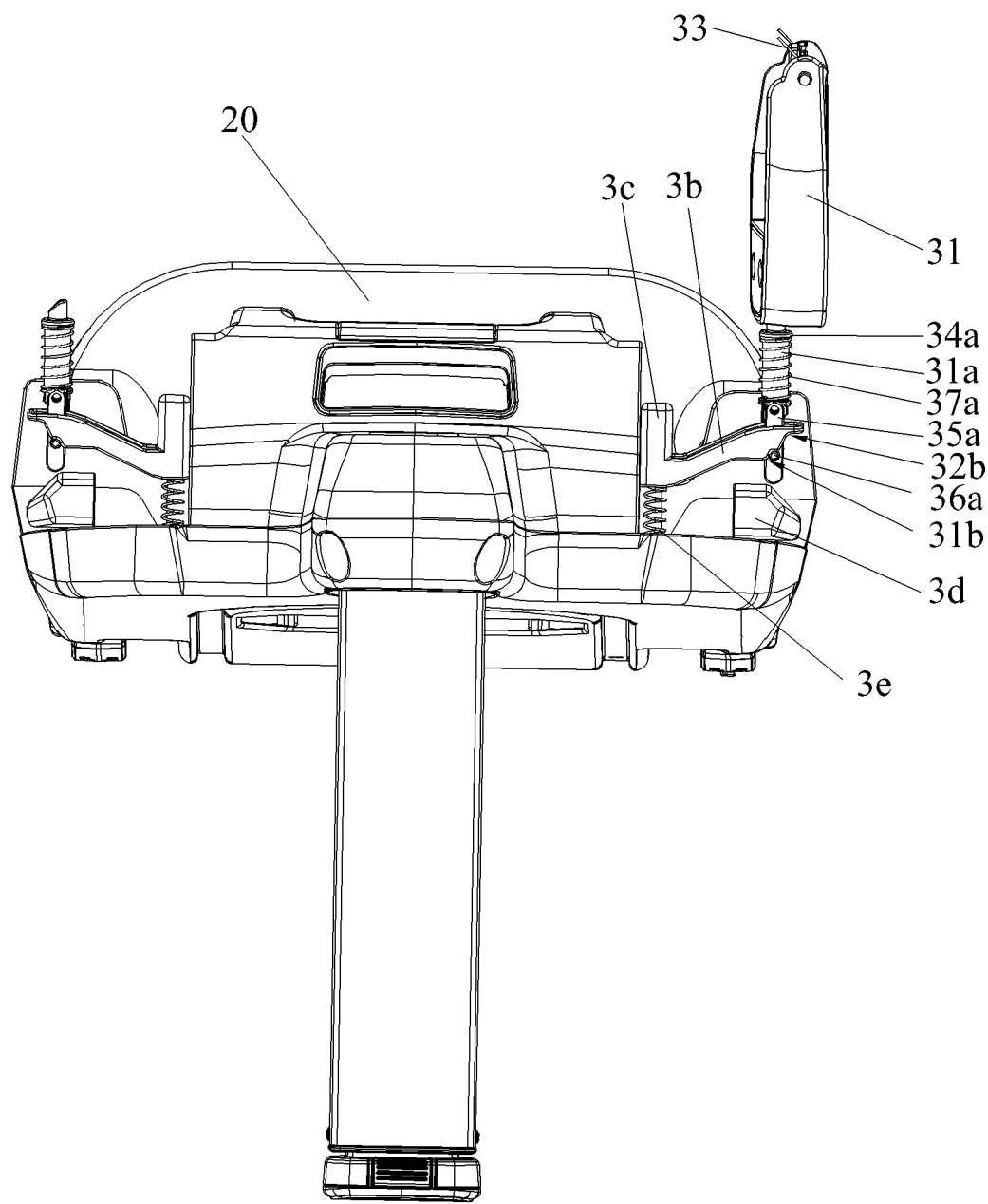
FIG. 13 is another partial diagram of the child car safety seat shown in FIG. 11 at another view according to the second embodiment of the present invention.

Please refer to FIG. 11 to FIG. 13. FIG. 11 is a schematic diagram of a child car safety seat in a using state without illustrating the seat body 10 according to a second embodiment of the present invention. FIG. 12 is a partial diagram of the child car safety seat shown in FIG. 11 according to the second embodiment of the present invention. FIG. 13 is another partial diagram of the child car safety seat shown in FIG. 11 at another view according to the second embodiment of the present invention. As shown in FIG. 11 to FIG. 13, different from the child car safety seat of the first embodiment, in this embodiment, the seat body 10 includes two engaging portions, which is not shown in figures, and two engaging slots are formed on two front corners of the base 20, which are not indicated by any numeral, so that the seat body 10 can be detachably installed on the base 20 by engagement of the engaging portions and the engaging slots. The two locking mechanisms 35 are disposed on the base 20. The two locking mechanisms 35 can be operated by the seat body 10 to sequentially switch to a first state and a second state while the seat body 10 is installed on the base 20. When the two locking mechanisms 35 are in the first state, the two protective fenders 31 are allowed to switch to the unfolded state by the two resilient components 33, which can achieve a purpose of preventing a situation in which a caregiver forgets to unfold the protective fender 31. When the two locking mechanisms 35 are in the second state, the two locking mechanisms 35 can engage with the two protective fenders 31 switching from the unfolded state to the folded state.

The two locking mechanisms 35 have identical structures. For simplicity, one of the two locking mechanisms 35 at one side is introduced as follows. The locking mechanism 35 includes a locking assembly 3a, an abutting component 3b and an abutting block 3c connected to the abutting component 3b. Preferably, the abutting block 3c can be disposed inside the engaging slot. However, it is not limited thereto. The locking assembly 3a is for engaging with the protective fender 31 to restrain movement of the protective fender 31. The locking assembly 3a includes two protruding lugs 36a. The abutting component 3b includes a first abutting portion 31b detachably abutting against the two protruding lugs 36a. The abutting component 3b can be driven by the abutting block 3c to press the two protruding lugs 36a to drive the locking assembly 3a to move to a releasing state to disengage from the protective fender 31 when the abutting block 3c is pressed downwardly by the engaging portion of the seat body 10 to a first position. At this moment, the protective fender 31 can switch to the unfolded state by the resilient component 33, and an included angle between the protective fender 31 in the unfolded state and a lateral surface of the base 20 can be substantially 100 degrees. However, it is not limited to thereto. The included angle between the protective fender 31 in the unfolded state and the lateral surface of the base 20 can be substantially from 90 to 145 degrees.

Afterwards, the abutting component 3b can be further driven by the abutting block 3c to disengage the first abutting portion 31b from the two protruding lugs 36a and to drive the locking assembly 3a to a locking state when the abutting block 3c is pressed downwardly by the seat body 10 from the first position to a second position lower than the first position. At this moment, the protective fender 31 switching from the unfolded state to the folded state can be engaged with and restrained by the locking assembly 3a in the locking state. However, the number of the protruding lug 36a is not limited to this embodiment. For example, in another embodiment, the locking mechanism can include only one protruding lug.

Besides, preferably, the locking mechanism 35 can further include a second recovering component 3e for biasing the abutting block 3c to recover. Specifically, the second recovering component 3e can abut between the base 20 and the abutting block 3c to bias the abutting block 3c to recover. Furthermore, preferably, the abutting block 3c and the abutting component 3b can be integrally formed to extend service lives of the abutting block 3c and the abutting component 3b and facilitate operations of the abutting block 3c and the abutting component 3b.

In order to ensure that the locking assembly 3a can be operated to be in the locking state for engaging the protective fender 31 after disengagement of the two protruding lugs 36a and the first abutting portion 31b, a range of the movements of the two protruding lugs 36a can be restrained. Preferably, the abutting component 3b can further include a second abutting portion 32b. A vertical distance between the second abutting portion 32b and the two protruding lugs 36a is greater than a vertical distance between the first abutting portion 31b and the two protruding lugs 36a. The two protruding lugs 36a abut against the second abutting portion 32b after the disengagement of the two protruding lugs 36a and the first abutting portion 31b, which can effectively restrain the range of the movements of the two protruding lugs 36a.

As shown in FIG. 11 to FIG. 13, the locking assembly 3a includes a locking rod 31a, a pivoting component 35a and a first recovering component 37a. The locking rod 31a includes a locking end 32a and a connecting end, which is not indicated by any numeral. The locking end 32a is for engaging with the protective fender 31 to restrain movement of the protective fender 31. The connecting end is pivoted to the pivoting component 35a. The two protruding lugs 36a are disposed on two sides of the pivoting component 35a. The first recovering component 37a is for biasing the locking rod 31a to recover to engage with the protective fender 31. Specifically, the locking assembly 3a further includes a block plate 34a located between the locking end 32a and the connecting end, and the first recovering component 37a abuts between the block plate 34a and the base 20. In other words, it is required to overcome a resilient force generated by the first recovering component 37a so that the abutting component 3b can press the two protruding lugs 36a.

Furthermore, the locking mechanism 35 further includes a pushing component 3d disposed beneath the pivoting component 35a. The pushing component 3d includes a pushing inclined surface 31d for abutting a lower end of the pivoting component 35a, and the pivoting component 35a is driven by the pushing inclined surface 31a to pivot to drive the two protruding lugs 36a to disengage from the first abutting portion 31b and then to engage with the second abutting portion 32b. Specifically, a through slot, which is not indicated by any numeral, is formed on the abutting component 3b. The pivoting component 35a passes through the through slot.

Operational principle of the child car safety seat of this embodiment is provided as follows.

When the child car safety seat is not in use, the seat body 10 can be detached from the base 20. At this moment, the protective fender 31 can be operated to switch to the folded state relative to the base 20, so that the protective fender 31 can be engaged with and restrained by the locking mechanism 35. At this time, the locking rod 31a is located at a locking position, and the locking end 32a of the locking rod 31a located above the block plate 34a engages with the protective fender 31. The first abutting portion 31b abuts against the two protruding lugs 35a.

When it is desired to use the child car safety seat, the seat body 10 can be installed on the base 20, so that the engaging portion of the seat body 10 press the abutting block 3c downwardly to the second position via the first position. During a process of the abutting block 3c moving to the first position, the abutting block 3c drives the first abutting portion 31b of the abutting component 3b to press the two protruding lugs 36a to drive the pivoting component 35 to move the locking rod 31a downwardly to disengage from the protective fender 31. At this moment, the protective fender 31 can be driven by the resilient component 33 to switch to the unfolded state.

Afterwards, during a process of the abutting block 3c moving from the first position to the second position, the abutting block 3c drives the first abutting portion 31b of the abutting component 3b to press the two protruding lugs 36a to drive the pivoting component 35 to move downwardly to abut against the pushing inclined surface 31a, so that the pivoting component 35a can be driven by the pushing inclined surface 31a to pivot to drive the two protruding lugs 36a to disengage from the first abutting portion 31b and then to engage with the second abutting portion 32b by the first recovering component 37a. At this moment, the locking rod 31a is driven to recover to the locking position. Therefore, when it is desired to fold the protective fender 31 at one side, the caregiver can operate the protective fender 31 manually, so that the locking rod 31a engages with the protective fender 31, which saves the occupied space. In other words, the child car safety seat of this embodiment can not only unfold the protective fender 31 by engagement of the seat body 10 and the base 20 for preventing the situation in which the caregiver forgets to unfold the protective fender 31 but also allow the protective fender 31 switching from the unfolded state to the folded state to be engaged with and restrained by the locking rod 31a for saving occupied space.

Figure 14:
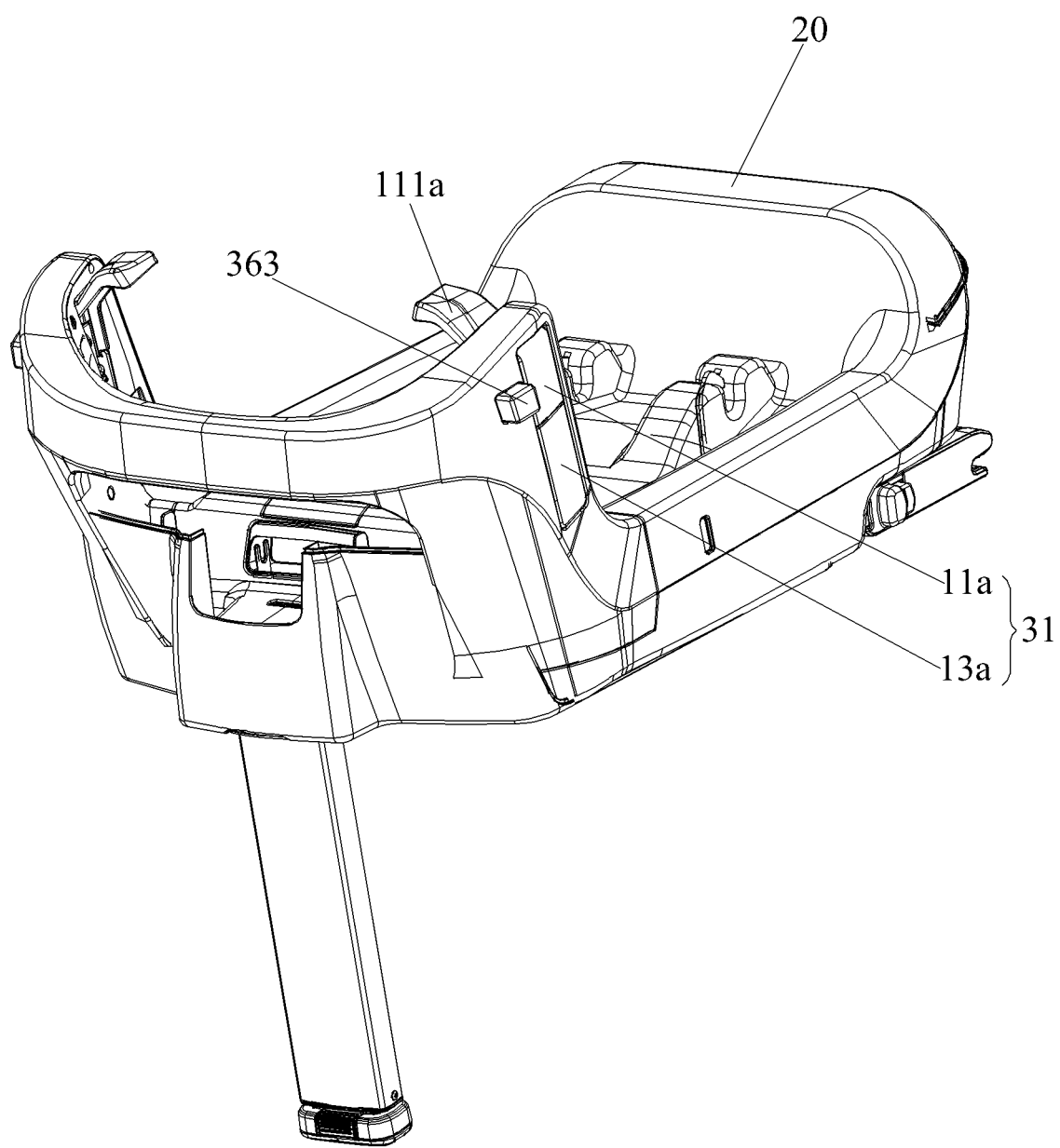
FIG. 14 to FIG. 16 are schematic diagrams of a child car safety seat in different states without illustrating a seat body according to a third embodiment of the present invention.
Figure 15:
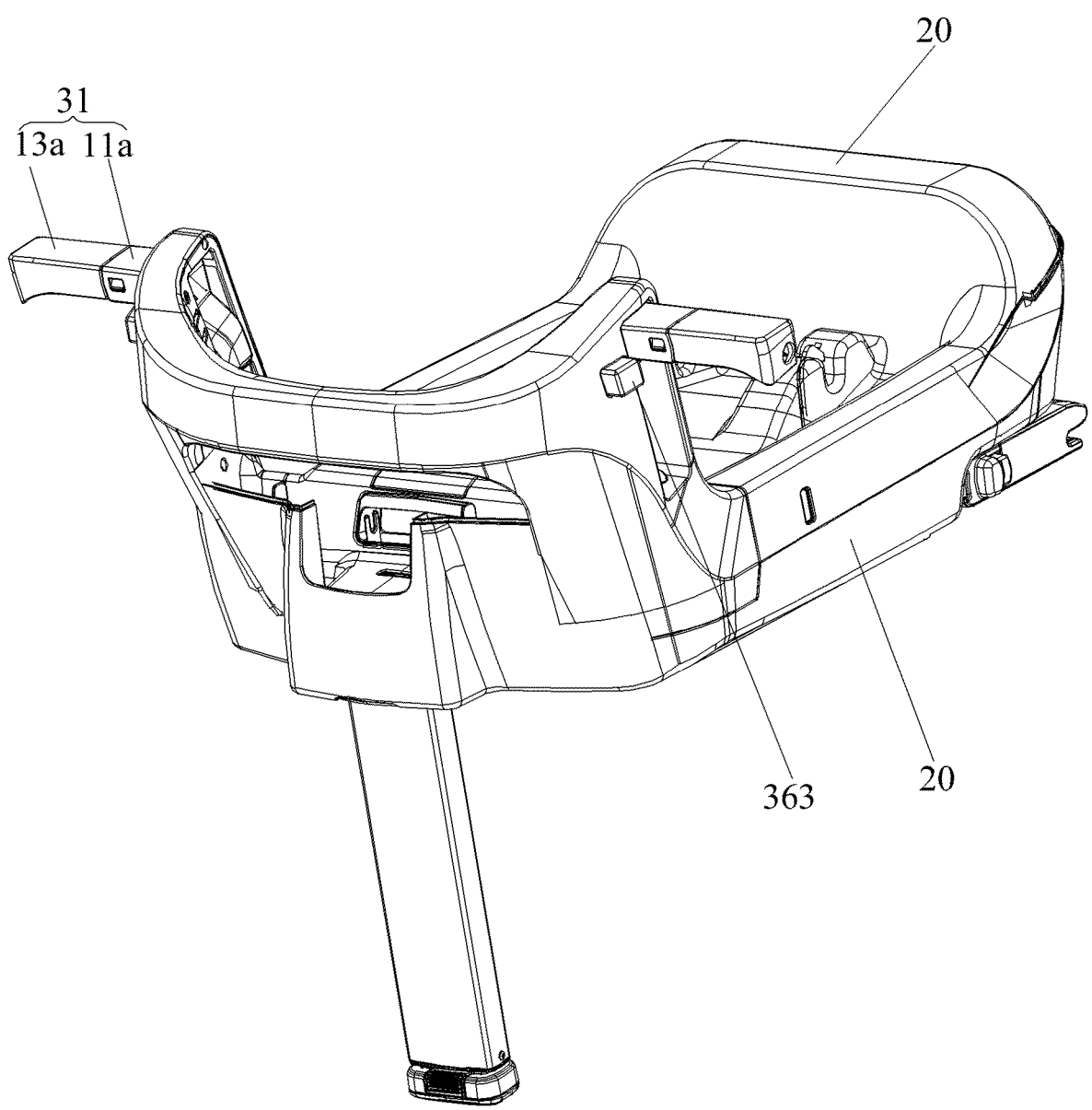
Figure 16:
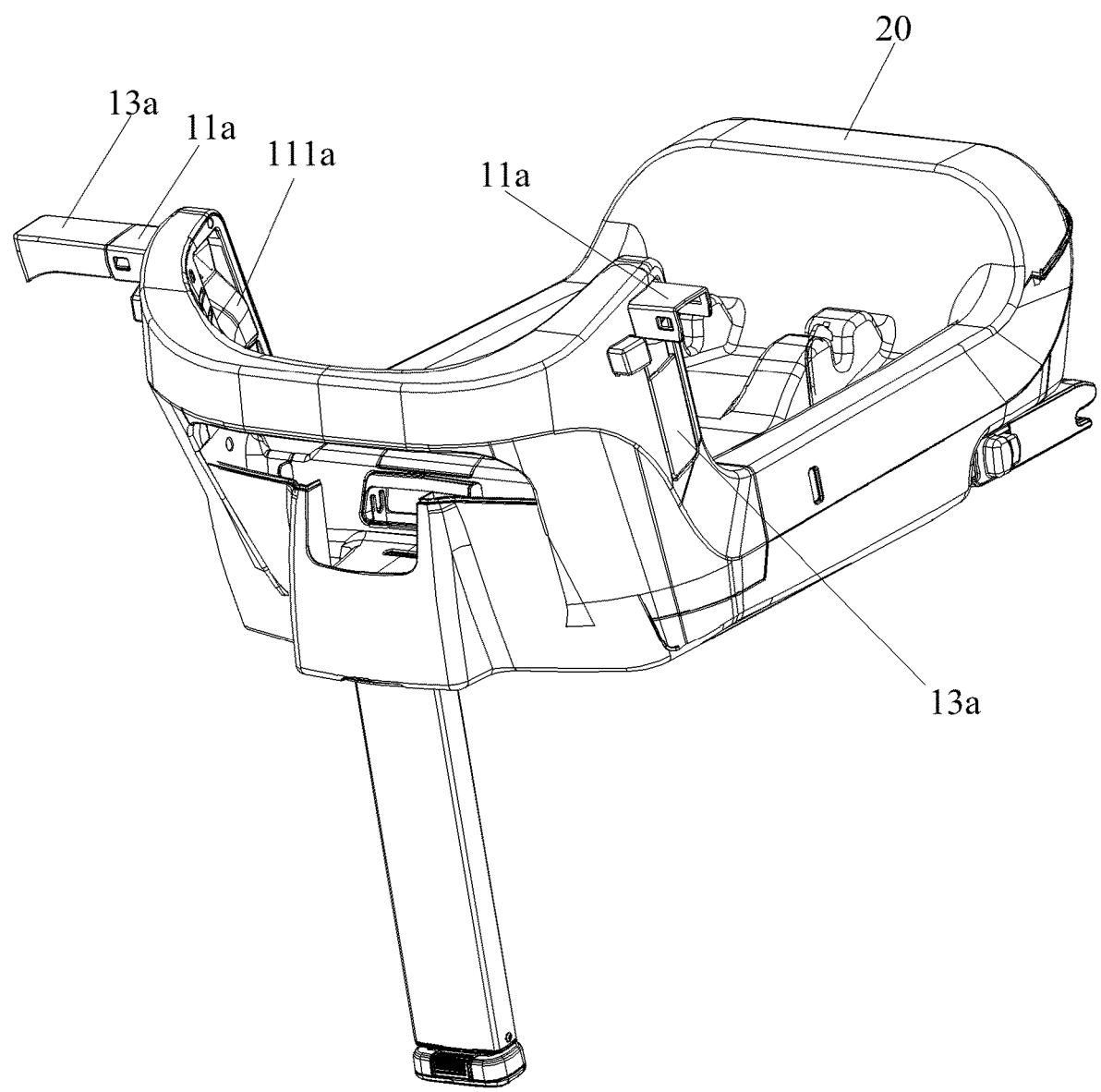
Figure 17:
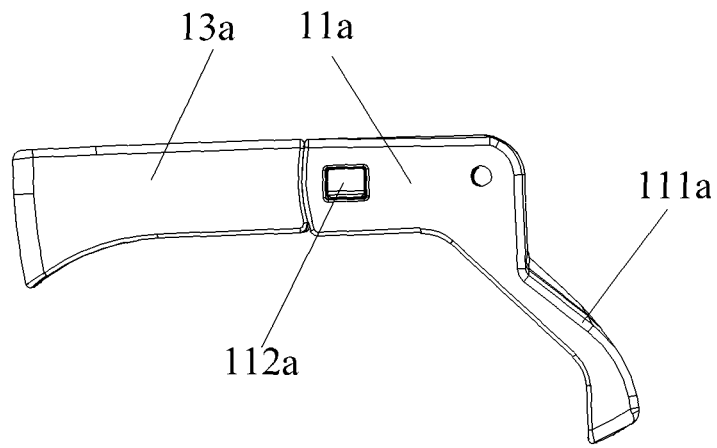
FIG. 17 is a diagram of a driving block at an unfolded position and a supporting block at an unfolded position shown in FIG. 15 according to the third embodiment of the present invention.
Figure 18:
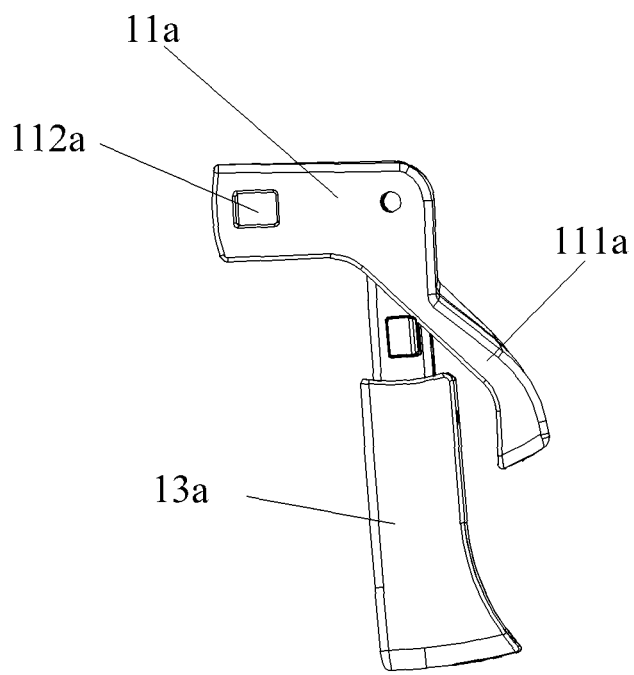
FIG. 18 is a diagram of the driving block at the unfolded position and the supporting block at a folded position shown in FIG. 16 according to the third embodiment of the present invention.
Figure 19:
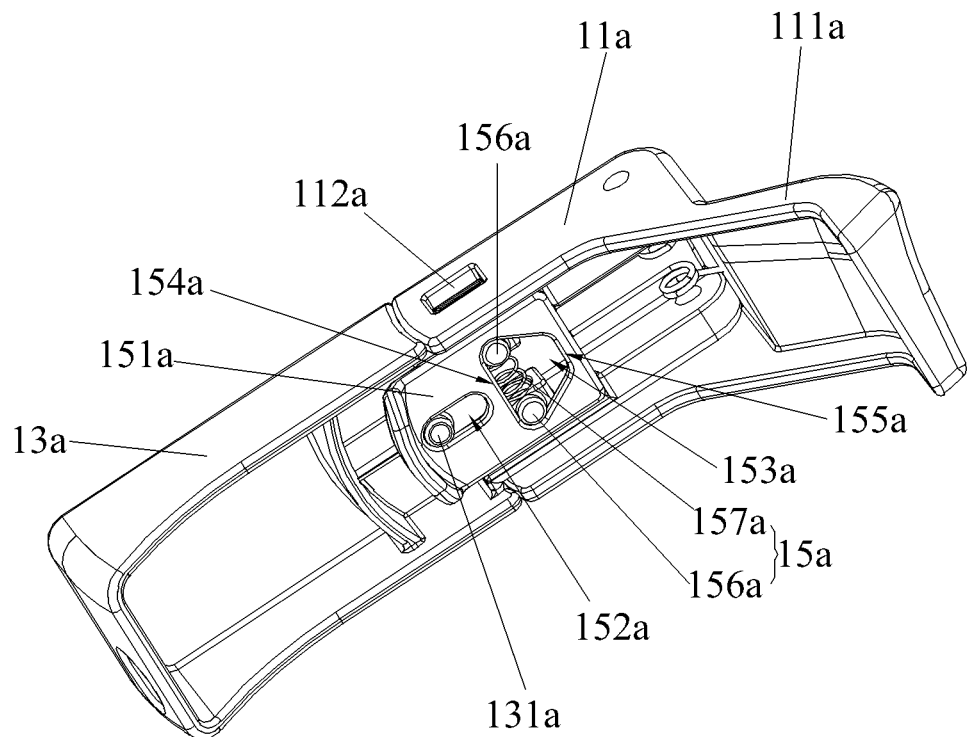
FIG. 19 is a diagram of the protective fender shown in FIG. 17 according to the third embodiment of the present invention.
Figure 20:
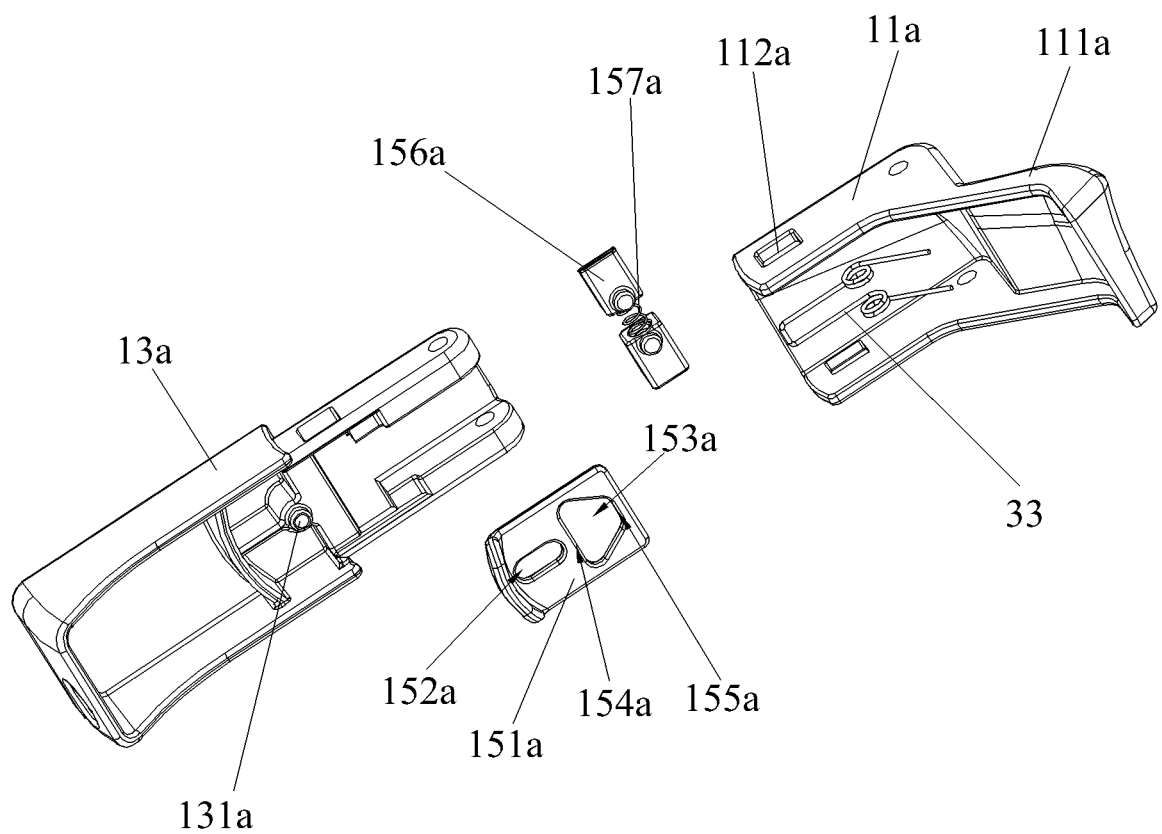
FIG. 20 is an exploded diagram of the protective fender shown in FIG. 19 according to the third embodiment of the present invention.
Figure 21:
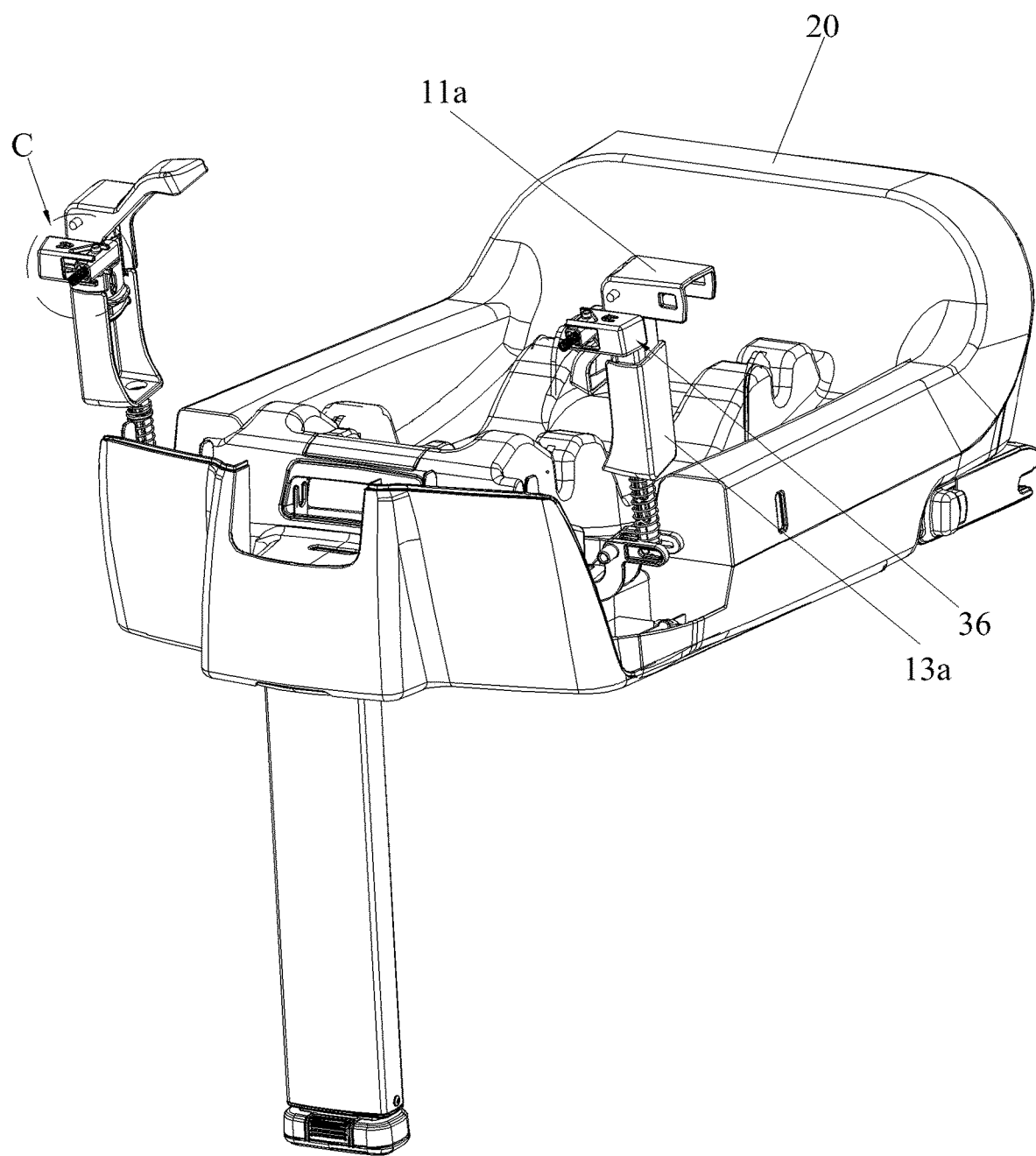
FIG. 21 is a partial diagram of the child car safety seat according to the third embodiment of the present invention.
Figure 22:
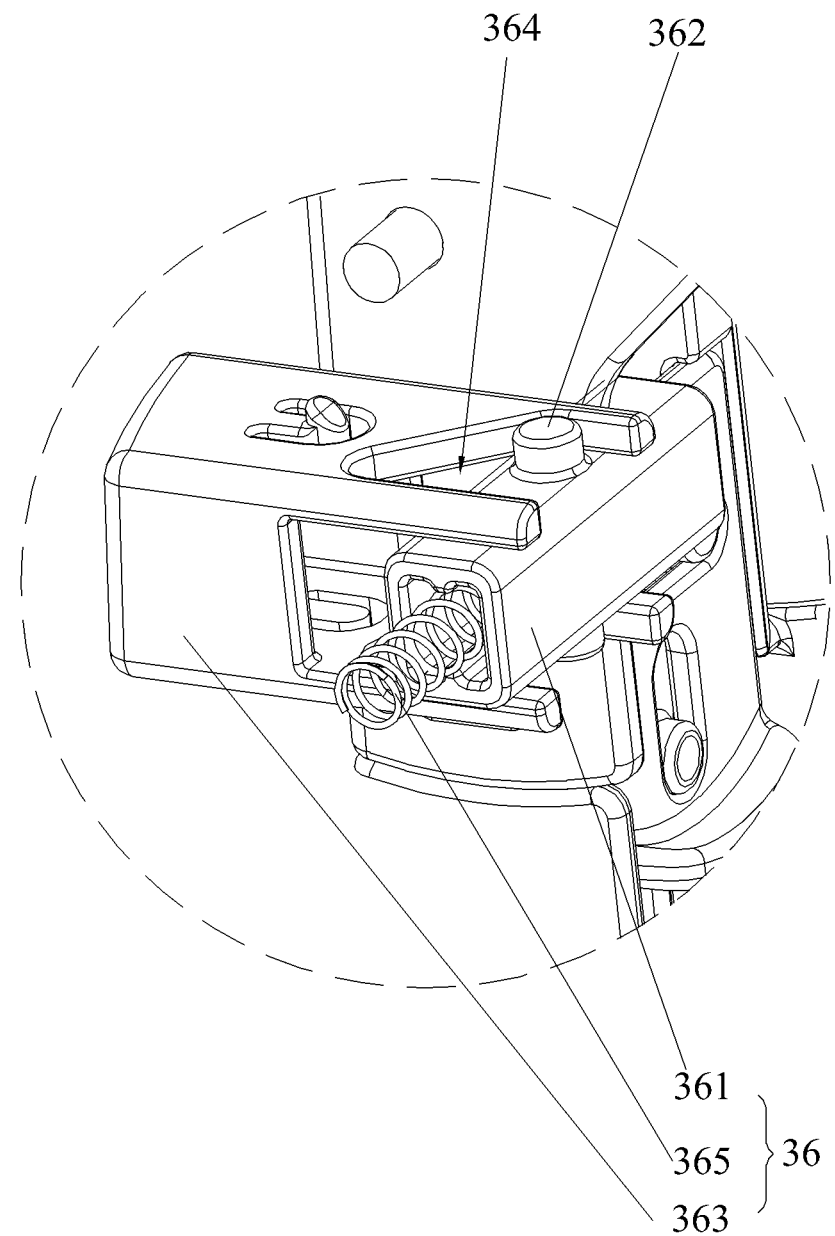
FIG. 22 is an enlarged diagram of a C portion of the child car safety seat shown in FIG. 21 according to the third embodiment of the present invention.
Figure 23:
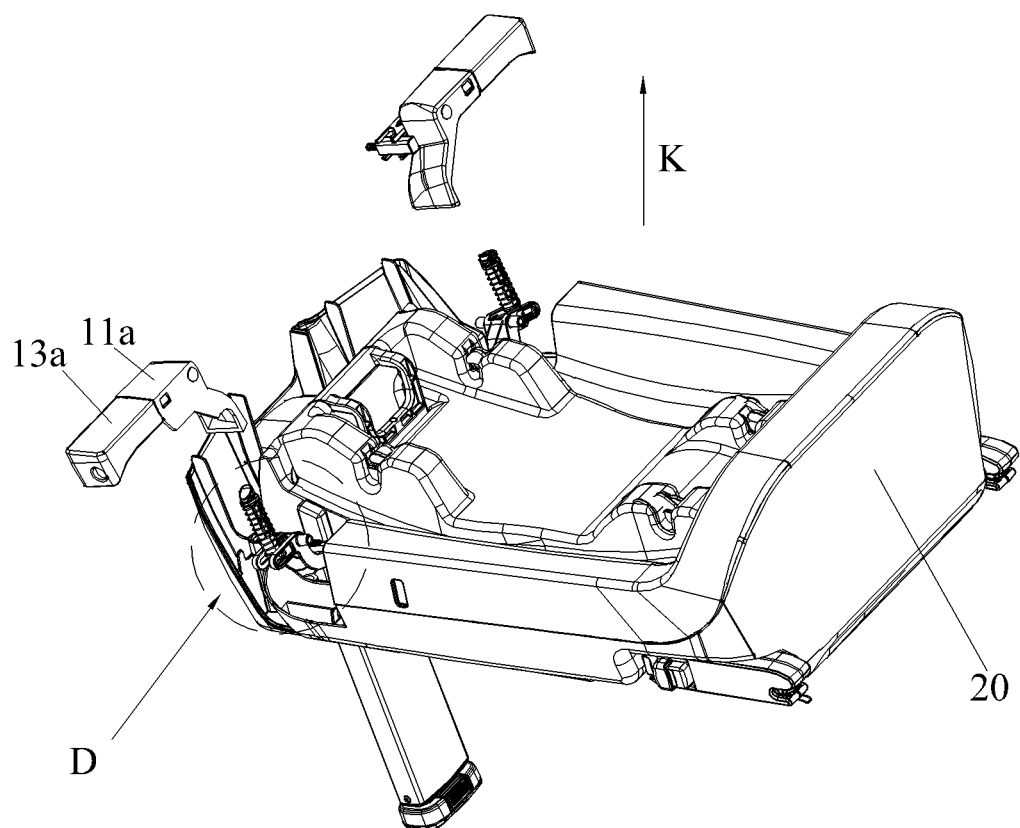
FIG. 23 is another partial diagram of the child car safety seat at another view according to the third embodiment of the present invention.
Figure 24:
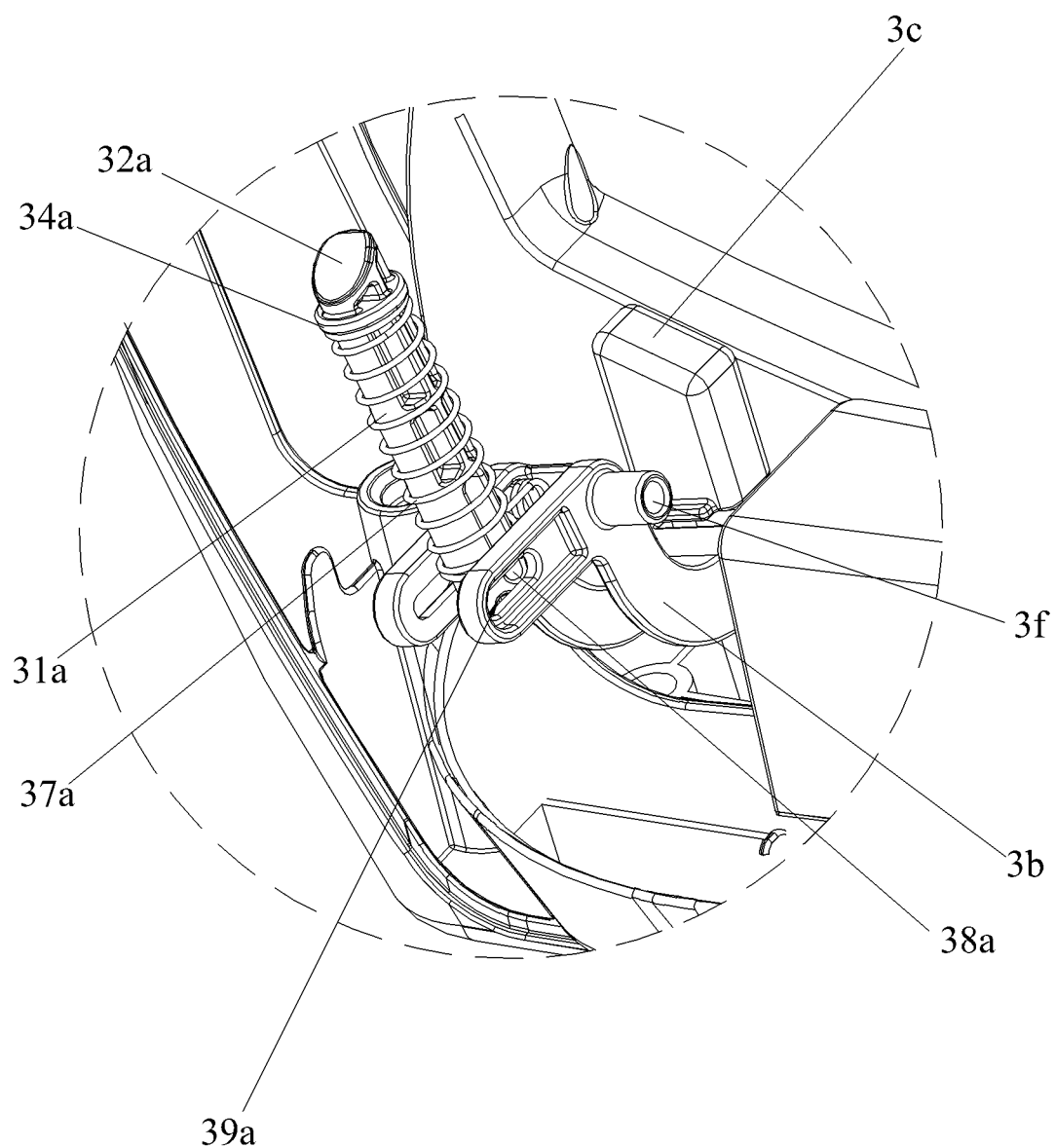
FIG. 24 is an enlarged diagram of a D portion of the child car safety seat shown in FIG. 23 according to the third embodiment of the present invention.

Please refer to FIG. 14 to FIG. 24. FIG. 14 to FIG. 16 are schematic diagrams of a child car safety seat in different states without illustrating the seat body 10 according to a third embodiment of the present invention. FIG. 17 is a diagram of a driving block 11a at an unfolded position and a supporting block 13a at an unfolded position shown in FIG. 15 according to the third embodiment of the present invention. FIG. 18 is a diagram of the driving block 11a at the unfolded position and the supporting block 13a at a folded position shown in FIG. 16 according to the third embodiment of the present invention. FIG. 19 is a diagram of the protective fender 31 shown in FIG. 17 according to the third embodiment of the present invention. FIG. 20 is an exploded diagram of the protective fender 31 shown in FIG. 19 according to the third embodiment of the present invention. FIG. 21 is a partial diagram of the child car safety seat according to the third embodiment of the present invention. FIG. 22 is an enlarged diagram of a C portion of the child car safety seat shown in FIG. 21 according to the third embodiment of the present invention. FIG. 23 is another partial diagram of the child car safety seat at another view according to the third embodiment of the present invention. FIG. 24 is an enlarged diagram of a D portion of the child car safety seat shown in FIG. 23 according to the third embodiment of the present invention. As shown in FIG. 14 to FIG. 20, different from the child car safety seats of the aforementioned embodiments, the protective fender 31 of this embodiment includes the driving block 11*a*, the supporting block 13*a* and a combining assembly 15*a*. The driving block 11*a* is pivoted to the base 20 and includes a protruding portion 111*a*. As shown in FIG. 14, the protruding portion 111*a* is biased to pivot upwardly to switch the protective fender 31 to the folded state. When the seat body 10 is not installed on the base 20, the protruding portion 111*a* is located at a raising position, so that the protective fender 31 is in the folded state. While the seat body 10 is installed on the base 20, the seat body 10 presses the protruding portion 111*a* to pivotally switch the protective fender 31 to the unfolded state. The supporting block 13*a* is pivoted to the driving block 11*a*. The supporting block 13*a* is pivotally connected to driving block 11*a* by the combining assembly 15*a* and pivotally switchable between a folded position and an unfolded position relative to the driving block 11*a*. Preferably, in this embodiment, a pivoting shaft of the supporting block 13*a* and the driving block 11*a* can be the same as a pivoting shaft of the driving block 11*a* and the base 20. However, it is not limited to this embodiment. When the protective fender 31 is in the unfolded state, the supporting block 13*a* is located at the unfolded position relative to the driving block 11*a*, and the driving block 11*a* is located at the unfolded position relative to the base 20. The supporting block 13*a* can be operated to pivot to the folded position relative to the driving block 11*a* and received inside a lateral portion of the base 20, as shown in FIG. 16 and FIG. 18, so as to save occupied space. However, at this moment, the driving block 11*a* is still located at the unfolded position relative to the base 20.

As shown in FIG. 19 and FIG. 20, the combining assembly 15*a* includes a pulling plate 151*a*, two inserting pins 156*a* and a first resilient component 157*a* located between the two inserting pins 156*a*. Two inserting slots 112*a* are formed on the driving block 11*a* for allowing the two inserting pins 156*a* to pass therethrough. A first pulling slot 152*a* and a second pulling slot 153*a* are formed on the pulling plate 151*a*. A first column 131*a* protrudes from the supporting block 13*a* and passes through the first pulling slot 152*a*. A second column, which is not indicated by any numeral, protrudes from each inserting pin 156*a* and passes through the second pulling slot 153*a*. The first resilient component 157*a* is for biasing the two inserting pins 156*a* to recover to engage with the two inserting slots 112*a*. The supporting block 13*a* is restrained from pivoting relative to the driving block 11*a* when the two inserting pins 156*a* engage with the two inserting slots 112*a*. The supporting block 13*a* is allowed to pivot relative to the driving block 11*a* when the pulling plate 151*a* is operated to disengage the two inserting pins 156*a* from the two inserting slots 112*a*.

Specifically, in this embodiment, the second pulling slot 153*a* includes a first side 154*a* and a second side 155*a*. A length of the second side 155*a* is less than a length of the first side 154*a*. The two inserting pins 156*a* are located at the first side 154*a* when the two inserting pins 156*a* engage with the two inserting slots 112*a*, so as to restrain pivotal movement of the supporting block 13*a* relative to the driving block 11*a*. Furthermore, the two inserting pins 156*a* are located at the second side 155*a* when the two inserting pins 156*a* disengage from the two inserting slots 112*a*, so as to allow the pivotal moment of the supporting block 13*a* relative to the driving block 11*a*. However, the numbers of the inserting pin 156*a* and the inserting slot 112*a* are not limited to this embodiment. For example, in another embodiment, the combining assembly also can include one inserting pin and one corresponding inserting slot for allowing or restraining the pivotal movement of the supporting block relative to the driving block.

As shown in FIG. 21 and FIG. 22, the lateral shock absorber 30 further includes a restraining mechanism 36. An end of the restraining mechanism 36 is disposed on the base 20. Another end of the restraining mechanism 36 is movable relative to the driving block 11*a* for engaging with the driving block 11*a* to restrain the driving block 11*a* from being pivotally folded relative to the base 20. In other words, the restraining mechanism 36 can ensure the protective fender 31 to be in the unfolded state even during a side impact collision. Furthermore, the restraining mechanism 36 includes a restraining component 361, a restraining switch 363 and a second resilient component 365. The restraining switch 363 is installed on the base 20. The second resilient component 365 abuts against the restraining component 361 and the base 20. An end of the restraining component 361 is installed on the restraining switch 363, and the restraining switch 363 controls another end of the restraining component 361 to extend outwardly to engage with driving block 11*a* or retract inwardly to disengage from the driving block 11*a*.

Specifically, a restraining slot 364 is formed on the restraining switch 363. The restraining slot 364 includes a first end and a second end. In this embodiment, the first end and the second end can be a closed end and an open end respectively. However, it is not limited thereto. A width of the restraining slot 364 gradually increases from the first end to the second end, and a restraining column 362 protrudes from the restraining component 361 and passes through the restraining slot 364. The restraining component 361 can be driven to engage with the driving block 11*a* or disengage from the driving block 11*a* by cooperation of the restraining column 362 and the restraining slot 364. In other words, in this embodiment, the end of the restraining component 361 is installed on the restraining switch 363, and the another end of the restraining component 361 is driven to extend outwardly to abut against a lower portion of the driving block 11*a* for restraining the driving block 11*a* from pivoting to the folded position relative to the base 20 or to retract inwardly to leave apart from the driving block 11*a* to allow the driving block 11*a* to pivot to the folded position relative to the base 20.

Operational principle of protective fender 31 of this embodiment is provided as follows.

When the protective fender 31 is in the unfolded state, the supporting block 13*a* is at the unfolded position relative to the driving block 11*a*, and the driving block 11*a* is at the unfolded position relative to the base 20. The another end of the restraining component 361 extends outwardly to abut against the lower portion of the driving block 11*a* for restraining the driving block 11a from pivoting to the folded state relative to the base 20. The two inserting pins 156a are located at the first side 154a and engage with the two inserting slots 112a, so as to restrain the pivotal movement of the supporting block 13a relative to the driving block 11a. When it is desired to fold the supporting block 13a relative to the driving block 11a, the pulling plate 151 can be operated to drive the two inserting pins 156a to move from the first side 154a to the second side 155a. During the aforementioned process, the first resilient component 157 is compressed, and a distance between the two inserting pins 156a is reduced, so that the two inserting pins 156a are driven to disengage from the tow inserting slots 112a to allow the supporting block 13a to pivot to the folded position to save occupied space. It should be noticed that, after the supporting block 13a pivots to the folded position, the driving block 11a is still at the unfold position, i.e., an end of the driving block 11a with the inserting slots 112a protrudes from the supporting block 13a or the lateral surface of the base 20. In order to pivot the driving block 11a to the folded position relative to the base 20, the restraining switch 363 can be operated to drive the restraining column 362 to move from the second end to the first end. During the aforementioned process, the second resilient component 365 is compressed, and the restraining component 361 retracts relative to the driving block 11a, so that the driving block 11a is allowed to pivot to the folded position relative to the base 20.

As shown in FIG. 23 and FIG. 24, the locking mechanism 35 includes the locking assembly 3a, the abutting component 3b, a third resilient component 3f and the abutting block 3c connected to the abutting component 3b. The locking assembly 3a is for engaging with the protective fender 31 to restrain movement of the protective fender 31. The third resilient component 3f is for biasing the abutting component 3b to disengage the locking assembly 31 from the protective fender 31 along a direction opposite to a direction K. The abutting component 3b is driven by the abutting block 3c to drive the locking assembly 3a to the locking state for engaging with the protective fender 31, particularly the supporting block 13a, when the abutting block 3c is pressed downwardly. The abutting component 3b is driven by the third resilient component 3f to drive the locking assembly 3a to leave away from the locking state to the releasing state when the abutting block 3c is not pressed. In this embodiment, preferably, the third resilient component 3f can be a torsional spring abutting against the abutting component 3b and the base 20, and the locking assembly 3a can be configured to move upwardly to engage with the protective fender 31. Furthermore, the locking mechanism 35 can be a seesaw mechanism, and the torsional spring can be configured to bias an end of the abutting component 3b near the locking assembly 3a to pivot downwardly. When the seat body 10 is installed on the base 20, the locking assembly 3a is in the locking state for engaging with the supporting block 13a of the folded protective fender 31 which is not in use. When the seat body 10 is detached from the base 20, the locking assembly 3a is in the releasing state for allowing the folded protective fender 31 to pivotally switch to the unfolded state, which can prevent the situation in which the caregiver forgets to unfold the protective fender 31.

As shown in FIG. 24, the locking assembly 3a includes the locking rod 31a and the first recovering component 37a. The locking rod 31a includes the locking end 32a and the connecting end, which is not indicated by any numeral. The locking end 32a is for engaging with the protective fender 31 to restrain movement of the protective fender 31. A sliding slot 39a is formed on the abutting component 3b. A sliding column 38a protrudes from the connecting end and passes through the sliding slot 39a, and the first recovering component 37a biases the locking rod 31a to recover to engage with the protective fender 31. Specifically, the locking assembly 3a further includes the block plate 34a located between the locking end 32a and the connecting end, and the first recovering component 37a abuts between the block plate 34a and the abutting component 3b.

Operational principle of the locking mechanism 35 of this embodiment is provided as follows.

When the child car safety seat is not in use, the seat body 10 can be detached from the base 20, so that the third resilient component 3f can drive the locking assembly 3a to move downwardly by the abutting component 3b to disengage the locking end 32 from the folded protective fender 31. Therefore, the protective fender 31 can switch from the folded state to the unfolded state by the resilient component 33, which can prevent the situation in which the caregiver forgets to unfold the protective fender 31.

When it is desired to use the child car safety seat, the seat body 10 can be installed on the base 20 to press the abutting block 3c to compress the third resilient component 3f and drive the locking assembly 3a to move upwardly to the locking state. At this moment, the protective fender 31 which is not in use, can be operated to switch to the folded state and restrained by the locking rod 31a, so as to save occupied space. Therefore, the protective fender 31 of this embodiment cannot be retrained by the locking mechanism 35 when the seat body 10 is detached from the base 20, which can prevent the situation in which the caregiver forgets to unfold the protective fender 31.

Figure 25:
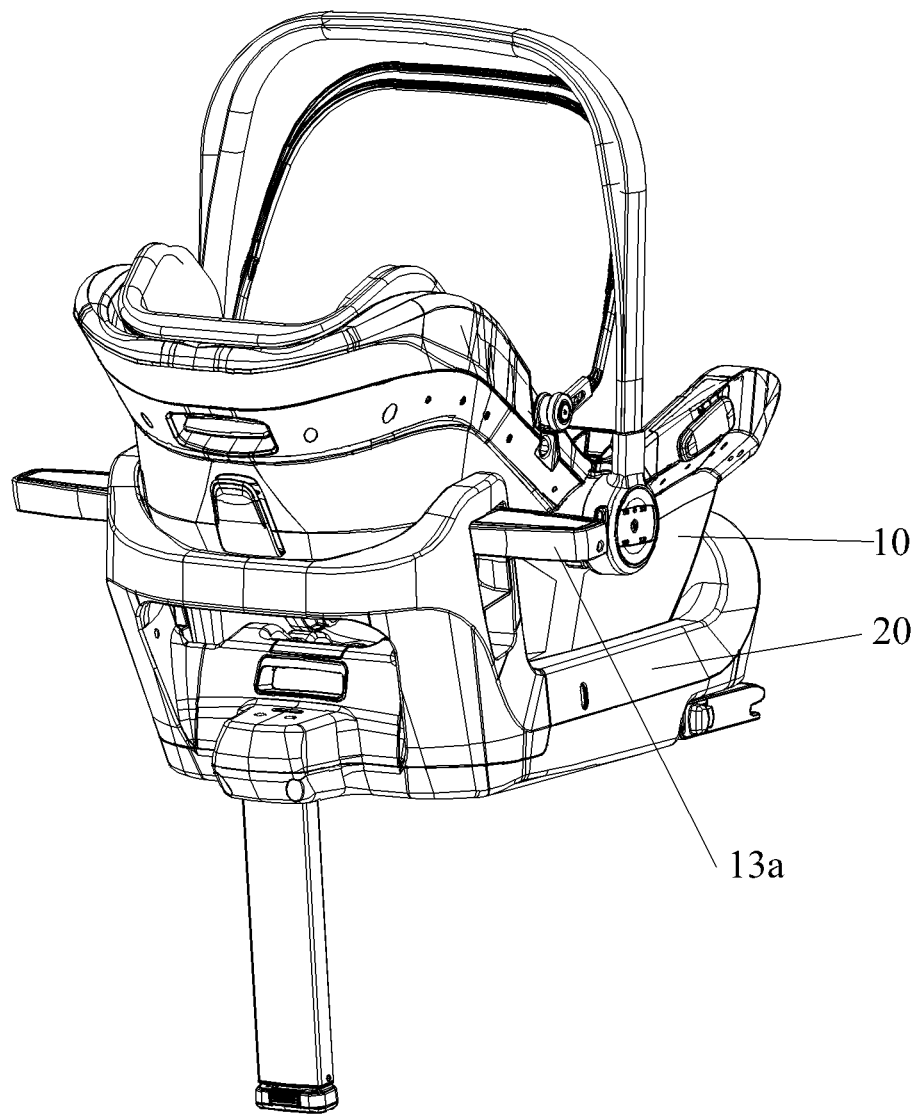
FIG. 25 and FIG. 26 are schematic diagrams of a child car safety seat in different states according to a fourth embodiment of the present invention.
Figure 26:
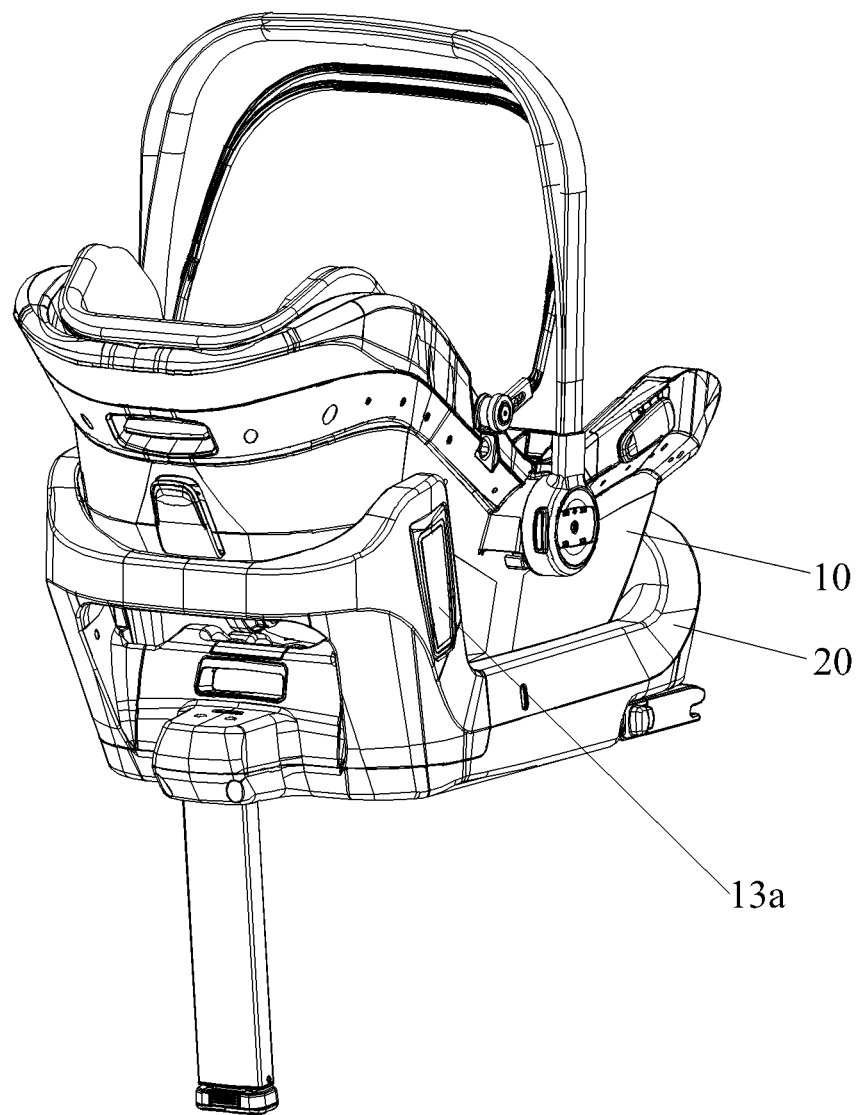
Figure 27:
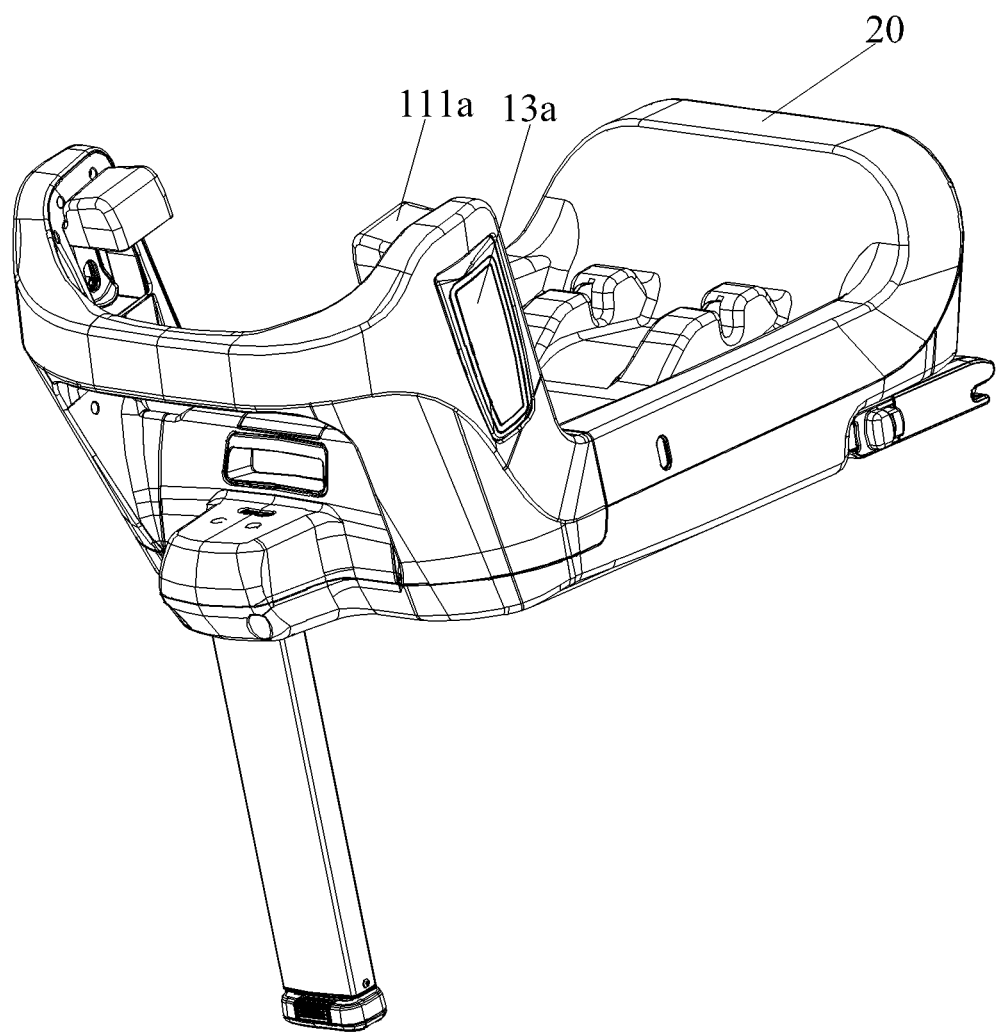
FIG. 27 is a diagram of the child car safety seat shown in FIG. 26 without illustrating a seat body according to the fourth embodiment of the present invention.
Figure 28:
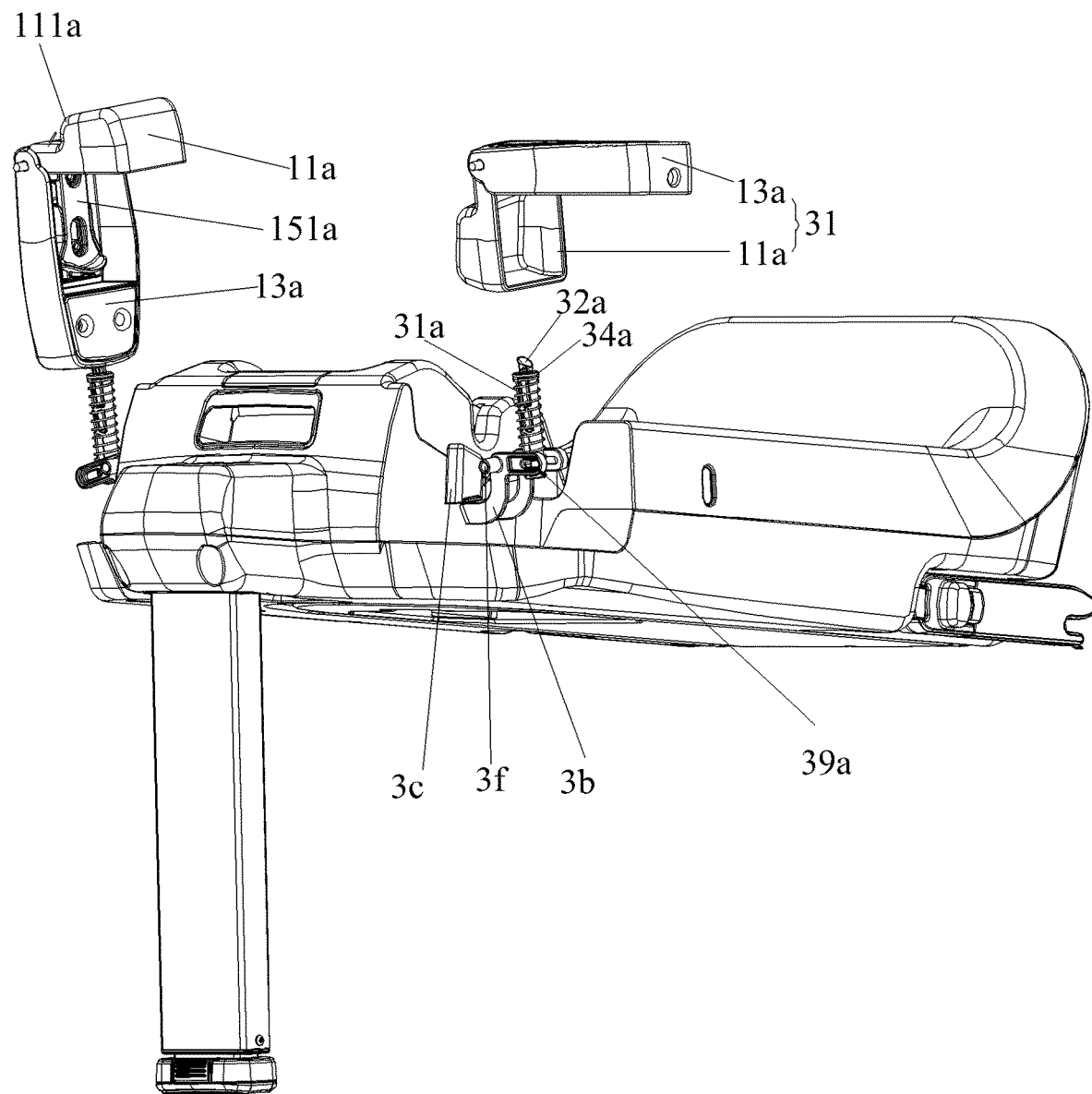
FIG. 28 is a partial diagram of the child car safety seat according to the fourth embodiment of the present invention.
Figure 29:
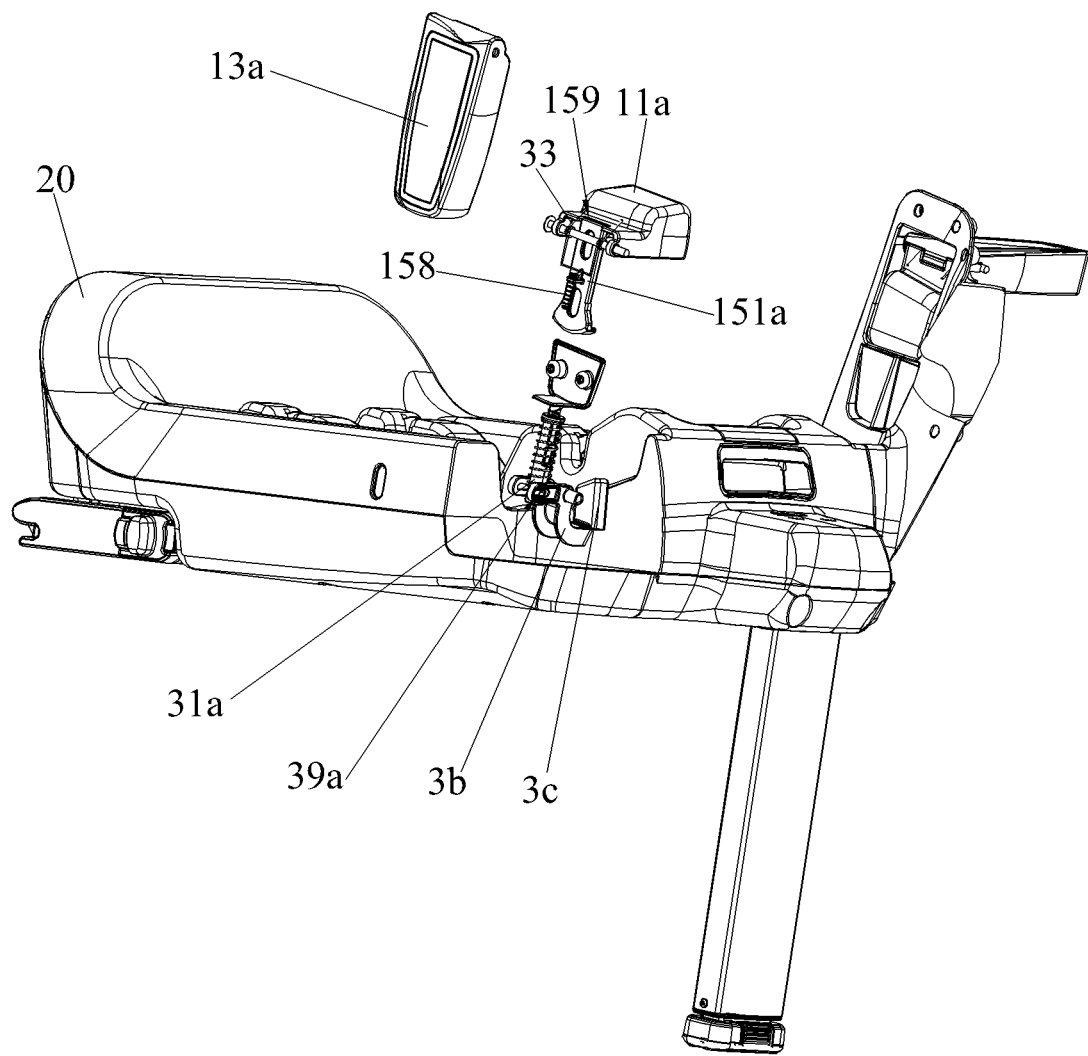
FIG. 29 is another partial diagram of the child car safety seat at another view according to the fourth embodiment of the present invention.

Please refer to FIG. 25 to FIG. 29. FIG. 25 and FIG. 26 are schematic diagrams of a child car safety seat in different states according to a fourth embodiment of the present invention. FIG. 27 is a diagram of the child car safety seat shown in FIG. 26 without illustrating the seat body 10 according to the fourth embodiment of the present invention. FIG. 28 is a partial diagram of the child car safety seat according to the fourth embodiment of the present invention. FIG. 29 is another partial diagram of the child car safety seat at another view according to the fourth embodiment of the present invention. As shown in FIG. 25 to FIG. 29, different from the child car safety seats of the aforementioned embodiment, the combining assembly 15a includes the pulling plate 151a and a first resilient unit 158. The first resilient unit 158 abuts between the pulling plate 151a and the supporting block 13a. A locking portion 159 is formed on an upper end of the pulling plate 151 for being inserted into a notch formed on the driving block 11a and located between the supporting block 13a and the driving block 11a, so as to retrain the pivotal movement of the supporting block 13a relative to the driving block 11a by interference between the locking portion 159 and the notch. When it is desired to pivot the supporting block 13a relative to the driving block 11a, the pulling plate 151a can be operated to remove the locking portion 159 from the notch to allow the pivotal movement of the supporting block 13a relative to the driving block 11a.

In this embodiment, the supporting block 13a is pivoted to the driving block 11a at a position near an end of the driving block 11a away from the protruding portion 111a, and the supporting block 13a is aligned with the end of the driving block 11a when the supporting block 13a is pivotally folded relative to the driving block 11a. In other words, in this embodiment, the pivoting shaft of the supporting block 13a and the driving block 11a can be different from the pivoting shaft of the driving block 11a and the base 20. Therefore, the driving block 11a does not protrude from the lateral surface of the base 20 when the supporting block 13a is pivoted to the folded position relative to the driving block 11a. However, in the third embodiment, the driving block 11a protrudes from the lateral surface. Furthermore, in this embodiment, the restraining mechanism 36 is omitted. When the seat body 10 is detached from the base 20, the unfolded protective fender 31 can be driven by gravity to pivot to the folded state. Besides, similarly, the included angle between the protective fender 31 in the unfolded state and the lateral surface of the base 20 can be substantially from 90 to 145 degrees, and preferably, in this embodiment, the included angle between the protective fender 31 in the unfolded state and the lateral surface of the base 20 can be substantially 100 degrees.

Other structures of this embodiment are similar to the ones of the third embodiment. Detailed description for those structures is omitted herein for simplicity.

In summary, the present invention utilizes the lateral shock absorber disposed on the base to collide with a car body during a side impact collision for transferring a side impact to the base and away from a child sitting in the child car safety seat. Therefore, it can effectively reduce a risk of injury or death of the child due to the side impact and provide enhanced protection for the child. Furthermore, the present invention utilizes the locking mechanism to restrain or allow pivotal movement of the protective fender of the lateral shock absorber in the folded state. Therefore, it has advantages of simple structure and easy operation and is capable of providing a convenient way for a caregiver to operate the lateral shock absorber.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A lateral shock absorber comprising:
a protective fender pivoted to a base of a child car safety seat and pivotally switchable between a folded state or an unfolded state relative to the child car safety seat;
a resilient component for biasing the protective fender to switch to the unfolded state, the resilient component being a torsional spring disposed on a pivoting shaft of the protective fender and abutting between the protective fender and the base; and
a locking mechanism for selectively engaging with the protective fender to restrain the protective fender from switching to the unfolded state or disengaging from the protective fender to allow the protective fender to switch to the unfolded state when the protective fender is located in the folded state.

2. The lateral shock absorber of claim 1, wherein the locking mechanism comprises a locking component and a recovering component, a locking hole is formed on one of the base and the protective fender, an installing hole is formed on the other one of the base and the protective fender, the locking component and the recovering component are installed inside the installing hole, and the recovering component biases the locking component to recover to engage with the locking hole for restraining the protective fender from moving.

3. The lateral shock absorber of claim 2, wherein the locking mechanism further comprises a restraining portion disposed inside the installing hole for restraining a displacement distance of the locking component.

4. The lateral shock absorber of claim 2, wherein the locking mechanism further comprises a driving pin, a through hole is formed on the locking component, and the driving pin is inserted into the through hole to be fixed on the locking component.

5. The lateral shock absorber of claim 4, further comprising a releasing portion disposed on a bottom portion of a seat body of the child car safety seat, and the releasing portion driving the driving pin to disengage the locking component from the locking hole when the seat body is installed on the base.

6. The lateral shock absorber of claim 2, wherein a first guiding inclined surface is formed on a lower end of the protective fender, a second guiding inclined surface is formed on the locking component, and the locking component is driven by cooperation of the first guiding inclined surface and the second guiding inclined surface and the recovering component to engage with the locking hole when the protective fender switches from the unfolded state to the folded state.

7. The lateral shock absorber of claim 1, wherein the locking mechanism is disposed on the base, the locking mechanism comprises a locking assembly, an abutting component and an abutting block connected to the abutting component, the locking assembly engages with the protective fender to restrain the protective fender from moving, the locking assembly comprises at least one protruding lug, the abutting component comprises a first abutting portion detachably abutting against the at least one protruding lug, the abutting component is driven by the abutting block to press the at least one protruding lug to disengage the locking assembly from the protective fender when the abutting block is pressed downwardly to a first position, and the abutting component is driven by the abutting block to disengage the first abutting portion from the at least one protruding lug when the abutting block is pressed downwardly from the first position to a second position lower than the first position.

8. The lateral shock absorber of claim 7, wherein the abutting component further comprises a second abutting portion, a vertical distance between the second abutting portion and the at least one protruding lug is greater than a vertical distance between the first abutting portion and the at least one protruding lug, and the at least one protruding lug abuts against the second abutting portion after disengagement of the at least one protruding lug and the first abutting portion.

9. The lateral shock absorber of claim 7, wherein the abutting block and the abutting component are integrally formed.

10. The lateral shock absorber of claim 7, wherein the locking assembly comprises a locking rod, a pivoting component and a first recovering component, the locking rod comprises a locking end and a connecting end, the locking end engages with the protective fender to restrain the protective fender from moving, the connecting end is pivoted to the pivoting component, the at least one protruding lug is disposed on the pivoting component, the first recovering component biases the locking rod to recover to engage with the protective fender, and when the abutting block is pressed downwardly from the first position to the second position, the abutting component is driven by the abutting block to disengage the first abutting portion from the at least one protruding lug, so that the locking rod is driven by the first recovering component to engage with the protective fender.

11. The lateral shock absorber of claim 10, wherein the locking rod further comprises a block plate located between the locking end and the connecting end, and the first recovering component abuts between the block plate and the base.

12. The lateral shock absorber of claim 10, wherein the locking mechanism further comprises a pushing component disposed beneath the pivoting component, the pushing component comprises a pushing inclined surface for abutting a lower end of the pivoting component, and the pivoting component is driven by the pushing inclined surface to pivot to disengage the at least one protruding lug from the first abutting portion.

13. The lateral shock absorber of claim 7, wherein the locking mechanism further comprises a second recovering component abutting against the base and the abutting block for biasing the abutting block to recover.

14. The lateral shock absorber of claim 1, wherein the protective fender comprises a driving block, a supporting block and a combining assembly, the driving block is pivoted to the base, the driving block comprises a protruding portion biased to pivot upwardly to switch the protective fender to the folded state, and the supporting block is pivoted to the driving block and engages with the driving block by the combining assembly.

15. The lateral shock absorber of claim 14, wherein an included angle between the protective fender in the unfolded state and a lateral surface of the base is substantially from 90 to 145 degrees.

16. The lateral shock absorber of claim 14, wherein the combining assembly comprises a pulling plate, at least one inserting pin and a first resilient component abutting against the at least one inserting pin, at least one inserting slot is formed on the driving block for allowing the at least one inserting pin to pass therethrough, the supporting block is pivoted to the driving block at a position between the at least one inserting slot and the protruding portion, a first pulling slot and a second pulling slot are formed on the pulling plate, a first column protrudes from the supporting block and passes through the first pulling slot, a second column protrudes from the at least one inserting pin and passes through the second pulling slot, the first resilient component biases the at least one inserting pin to recover to engage with the at least one inserting slot, the supporting block is restrained from pivoting relative to the driving block when the at least one inserting pin engages with the at least one inserting slot, and the supporting block is allowed to pivot relative to the driving block when the pulling plate is operated to disengage the at least one inserting pin from the at least one inserting slot.

17. The lateral shock absorber of claim 16, wherein the second pulling slot comprises a first side and a second side, a length of the second side is less than a length of the first side, the at least one inserting pin is located at the first side when the at least one inserting pin engages with the at least one inserting slot, and the at least one inserting pin is located at the second side when the at least one inserting pin disengages from the at least one inserting slot.

18. The lateral shock absorber of claim 14, wherein the combining assembly comprises a pulling plate and a first resilient unit, the first resilient unit abuts between the pulling plate and the supporting block, the supporting block is pivoted to the driving block at a position near an end of the driving block away from the protruding portion, and the supporting block is aligned with the end of the driving block when the supporting block is pivotally folded relative to the driving block.

19. The lateral shock absorber of claim 18, wherein the restraining mechanism comprises a restraining component, a restraining switch and a second resilient component, the restraining switch is installed on the base, the second resilient component abuts against the restraining component and the base, an end of the restraining component is installed on the restraining switch, and the restraining switch controls another end of the restraining component to extend outwardly to engage with driving block or retract inwardly to disengage from the driving block.

20. The lateral shock absorber of claim 19, wherein a restraining slot is formed on the restraining switch, the restraining slot comprises a first end and a second end, a width of the restraining slot gradually increases from the first end to the second end, and a restraining column protrudes from the restraining component and passes through the restraining slot.

21. The lateral shock absorber of claim 14, further comprising a restraining mechanism, an end of the restraining mechanism being disposed on the base, and another end of the restraining mechanism being movable relative to the driving block for engaging with the driving block to restrain the driving block from being pivotally folded relative to the base.

22. The lateral shock absorber of claim 1, wherein the locking mechanism is disposed on the base, the locking mechanism comprises a locking assembly, an abutting component movably connected to the locking assembly, a third resilient component and an abutting block connected to the abutting component, the locking assembly engages with the protective fender to restrain the protective fender from moving, the third resilient component biases the abutting component to disengage the locking assembly from the protective fender, the abutting component is driven by the abutting block to engage the locking assembly with the protective fender when the abutting block is pressed downwardly, and the abutting component is driven by the third resilient component to disengage the locking assembly from the protective fender when the abutting block is not pressed.

23. The lateral shock absorber of claim 22, wherein the locking assembly comprises a locking rod and a first recovering component, the locking rod comprises a locking end and a connecting end, the locking end engages with the protective fender to restrain the protective fender from moving, a sliding slot is formed on the abutting component, a sliding column protrudes from the connecting end and passes through the sliding slot, and the first recovering component biases the locking rod to recover to engage with the protective fender.

24. The lateral shock absorber of claim 23, wherein the locking rod further comprises a block plate located between the locking end and the connecting end, and the first recovering component abuts between the block plate and the abutting component.

25. A child car safety seat comprising:
a base comprising at least one connecting portion; and
at least one lateral shock absorber pivoted to the at least one connecting portion, the at least one lateral shock absorber comprising:
a protective fender pivoted to the base and pivotally switchable between a folded state or an unfolded state relative to the base;
a locking mechanism for selectively engaging with the protective fender to restrain the protective fender from switching to the unfolded state or disengaging from the protective fender to allow the protective fender to switch to the unfolded state when the protective fender is located in the folded state, a long slot being formed on the at least one connecting portion for allowing the locking mechanism to be operated to disengage from the protective fender; and a resilient component for biasing the protective fender to switch to the unfolded state.

26. The child car safety seat of claim 25, wherein a first recess is formed on an upper end of the at least one connecting portion for installing an end of the resilient component.

27. The child car safety seat of claim 26, wherein a second recess is formed on the at least one connecting portion, and a first protrusion is formed on the at least one lateral shock absorber and located at a position corresponding to the second recess.

28. The child car safety seat of claim 25, further comprising a seat body, the seat body comprising at least one engaging portion, at least one engaging slot being formed on the base, and the seat body being detachably installed on the base by engagement of the at least one engaging portion and the at least one engaging slot.

29. The child car safety seat of claim 25, further comprising an operating component connected to the locking mechanism for driving the locking mechanism to disengage from the protective fender.

* * * * *